US012607705B2

(12) United States Patent
Hirzallah et al.

(10) Patent No.: US 12,607,705 B2
(45) Date of Patent: Apr. 21, 2026

(54) POSITIONING ENVIRONMENT SIMULATION BASED UPON MODELING

(71) Applicant: QUALCOMM Incorporated, San Diego, CA (US)

(72) Inventors: Mohammed Ali Mohammed Hirzallah, San Diego, CA (US); Mohammad Tarek Fahim, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 18/464,021

(22) Filed: Sep. 8, 2023

(65) Prior Publication Data

US 2025/0085382 A1      Mar. 13, 2025

(51) Int. Cl.
*G01S 5/02* (2010.01)
*G01S 5/00* (2006.01)

(52) U.S. Cl.
CPC ........ *G01S 5/02528* (2020.05); *G01S 5/0036* (2013.01)

(58) Field of Classification Search
CPC .... G01S 5/02528; G01S 5/0036; G01S 1/028; G01S 5/0278; G01S 5/0236; G06N 20/00
USPC ...................................................... 455/456.2
See application file for complete search history.

(56) References Cited

U.S. PATENT DOCUMENTS

| | | | | |
|---|---|---|---|---|
| 11,521,009 B2 * | 12/2022 | Peake | ..................... | G06F 13/28 |
| 11,693,417 B2 * | 7/2023 | George | ................ | G05D 1/0221 |
| | | | | 701/23 |
| 11,734,473 B2 * | 8/2023 | Modalavalasa | ...... | G05D 1/0088 |
| | | | | 703/8 |
| 12,112,432 B2 * | 10/2024 | Atsmon | ................... | G05D 1/81 |

(Continued)

FOREIGN PATENT DOCUMENTS

| | | |
|---|---|---|
| AU | 2020392228 A1 | 7/2022 |
| CN | 112866904 A | 5/2021 |

(Continued)

OTHER PUBLICATIONS

International Search Report and Written Opinion—PCT/US2024/044373—ISA/EPO—Feb. 10, 2025.

(Continued)

*Primary Examiner* — Mahendra R Patel
(74) *Attorney, Agent, or Firm* — Procopio, Cory, Hargreaves & Savitch LLP

(57) ABSTRACT

A wireless device may receive environment information associated with an area. The wireless device may simulate a set of positioning measurements based on the environment information. The wireless device may calculate a positioning environment based on the simulated set of positioning measurements. The wireless device may calculate the positioning environment further based on a set of measured positioning signals obtained by the wireless device. The wireless device may output the positioning environment to train a positioning model. The wireless device may output the positioning environment by training the positioning model at the wireless device based on the positioning environment. The wireless device may output the positioning environment by transmitting the positioning environment to a training entity to train the positioning model.

16 Claims, 19 Drawing Sheets

(56)     References Cited

U.S. PATENT DOCUMENTS

| | | | | |
|---|---|---|---|---|
| 12,313,759 | B2 * | 5/2025 | Zorgui ................. | G01S 5/0263 |
| 2021/0286923 | A1 * | 9/2021 | Kristensen ............ | G06N 3/096 |
| 2021/0350046 | A1 | 11/2021 | Bosson et al. | |
| 2023/0324501 | A1 * | 10/2023 | Feigl .................... | G01S 5/0273 |
| | | | | 342/451 |
| 2023/0401274 | A1 * | 12/2023 | Denninghoff ...... | G06Q 30/0251 |
| 2024/0244395 | A1 * | 7/2024 | Robstad .................. | G06N 3/09 |
| 2024/0397286 | A1 * | 11/2024 | Hirzallah ............. | H04W 4/029 |

FOREIGN PATENT DOCUMENTS

| | | | | | |
|---|---|---|---|---|---|
| GB | 2606540 | A | * 11/2022 | .......... | H04W 64/003 |
| JP | 5632843 | B2 | 11/2014 | | |
| WO | 2022128588 | A2 | 6/2022 | | |
| WO | WO-2022184127 | A1 | * 9/2022 | ............ | G01S 19/23 |
| WO | 2022238508 | A1 | 11/2022 | | |
| WO | WO-2022261674 | A1 | * 12/2022 | ......... | H04B 7/18504 |
| WO | WO-2023106990 | A1 | * 6/2023 | ....... | G05B 19/41885 |
| WO | WO-2024025863 | A1 | * 2/2024 | ............ | G06N 20/00 |
| WO | WO-2025018925 | A1 | * 1/2025 | ............ | G06N 20/00 |

OTHER PUBLICATIONS

Partial International Search Report—PCT/US2024/044373—ISA/EPO—Dec. 18, 2024.

* cited by examiner $\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

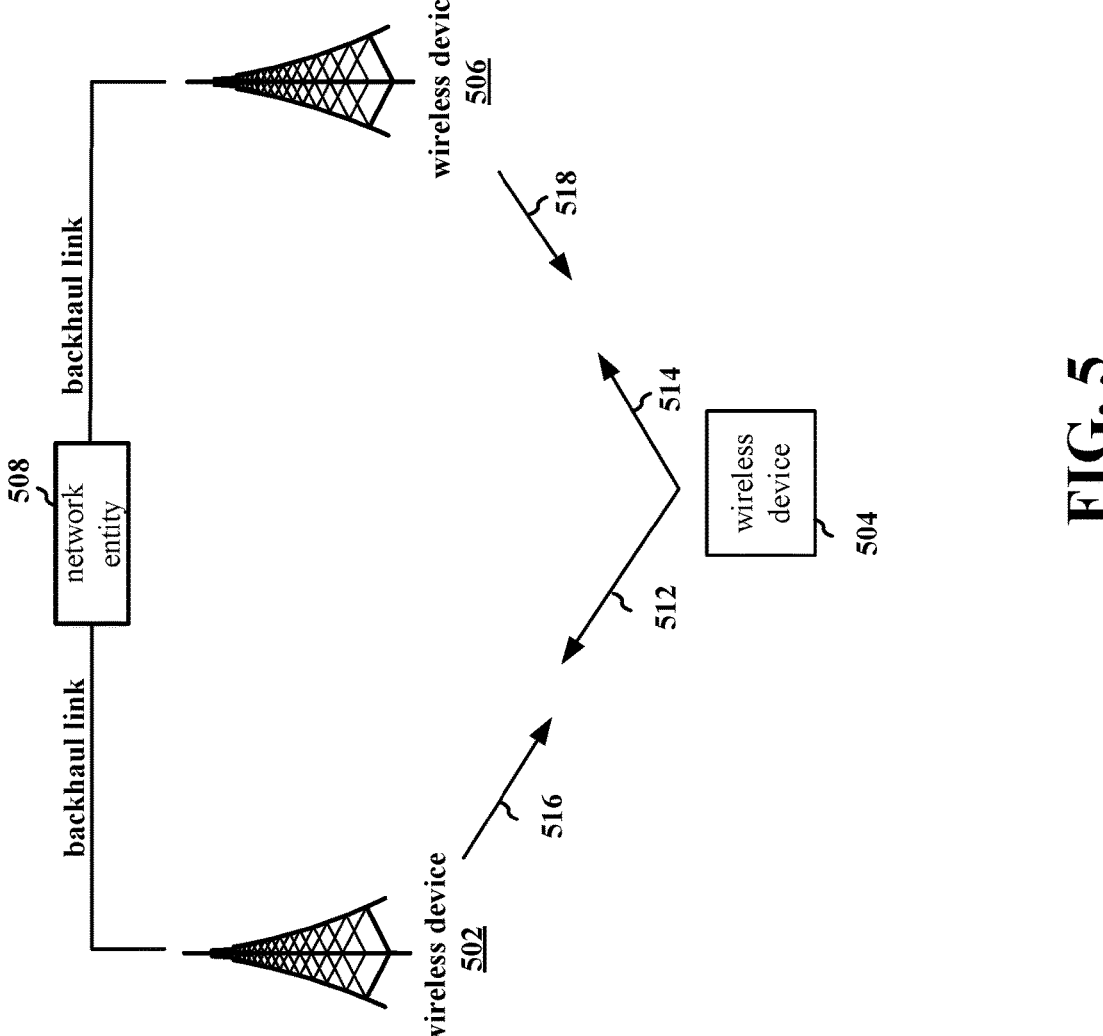
FIG. 5

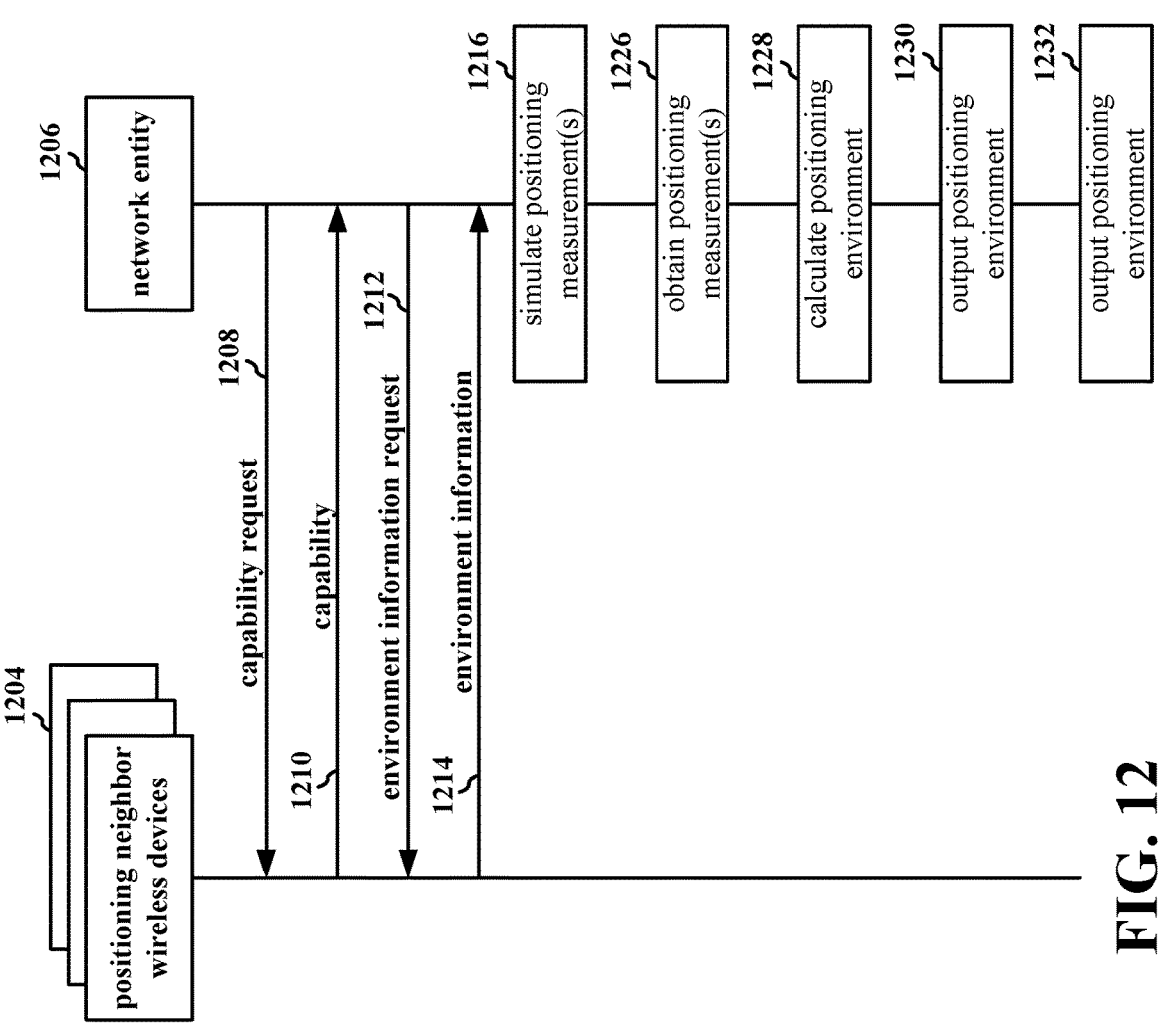
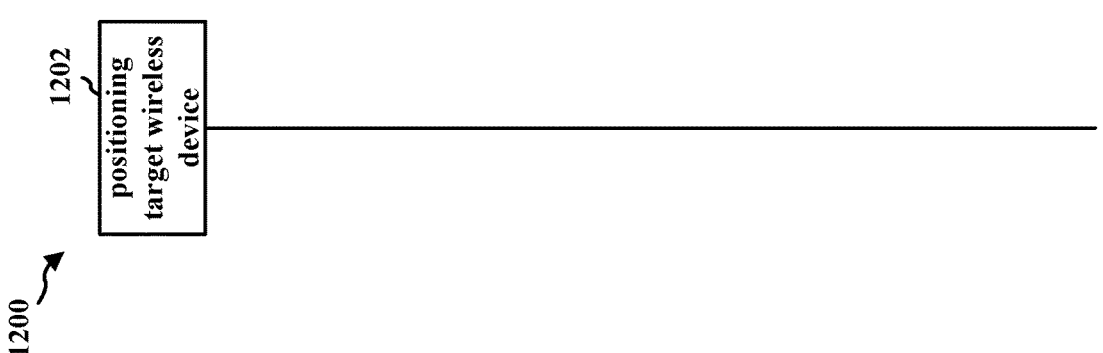
FIG. 12

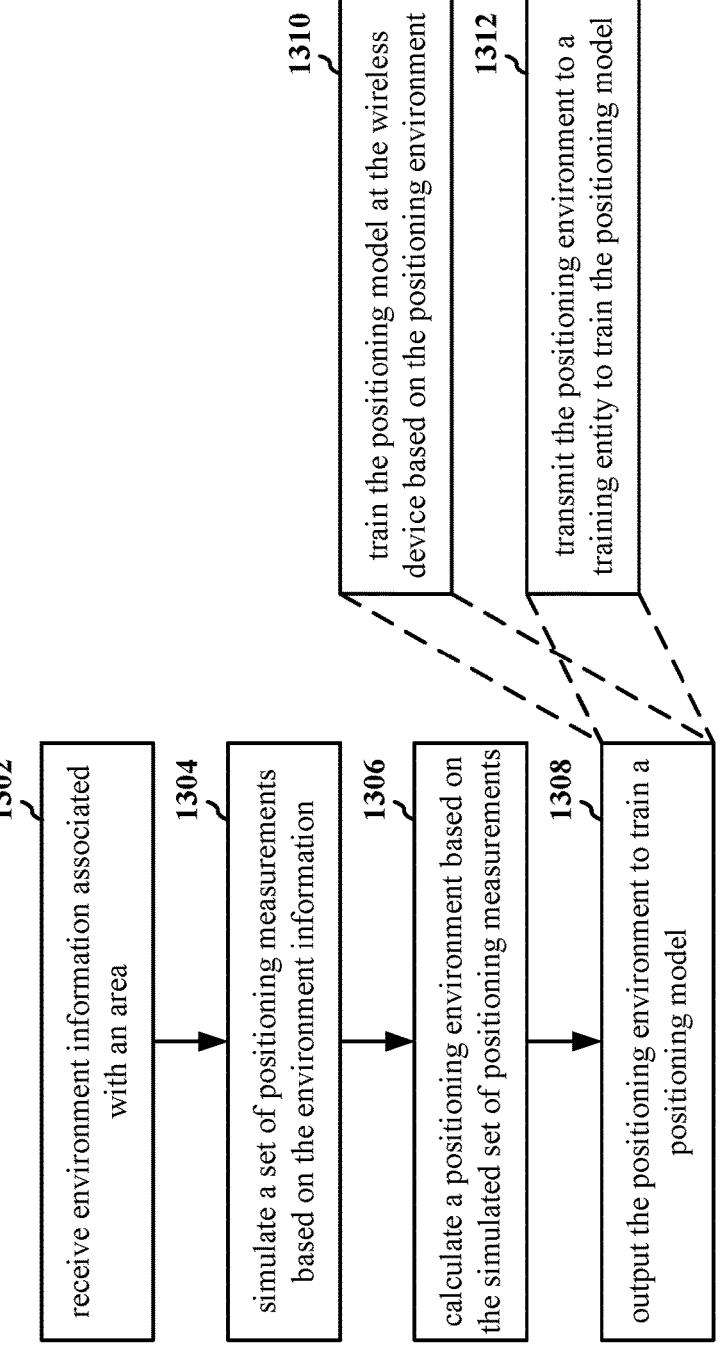

1300

1302 receive environment information associated with an area 1304 simulate a set of positioning measurements based on the environment information 1306 calculate a positioning environment based on the simulated set of positioning measurements 1308 output the positioning environment to train a positioning model 1310 train the positioning model at the wireless device based on the positioning environment 1312 transmit the positioning environment to a training entity to train the positioning model

FIG. 13

1502 receive an indicator of a request for environment information associated with an area

1504 transmit, in response to the request, the environment information associated with the area to train a positioning model based on simulated positioning measurements based on the environment information

1500

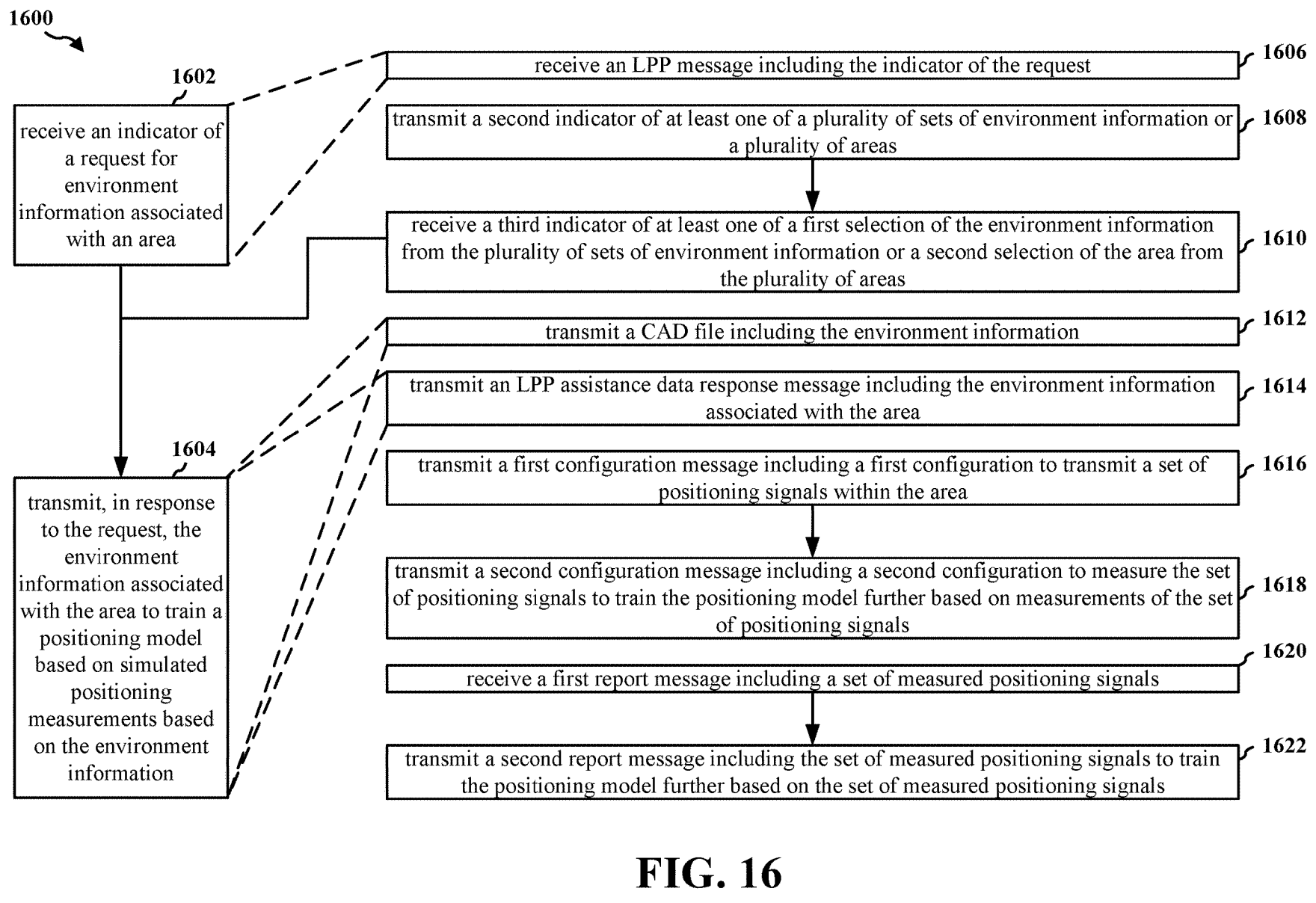

1600

1602 receive an indicator of a request for environment information associated with an area 1604 transmit, in response to the request, the environment information associated with the area to train a positioning model based on simulated positioning measurements based on the environment information 1606 receive an LPP message including the indicator of the request 1608 transmit a second indicator of at least one of a plurality of sets of environment information or a plurality of areas 1610 receive a third indicator of at least one of a first selection of the environment information from the plurality of sets of environment information or a second selection of the area from the plurality of areas 1612 transmit a CAD file including the environment information 1614 transmit an LPP assistance data response message including the environment information associated with the area 1616 transmit a first configuration message including a first configuration to transmit a set of positioning signals within the area 1618 transmit a second configuration message including a second configuration to measure the set of positioning signals to train the positioning model further based on measurements of the set of positioning signals 1620 receive a first report message including a set of measured positioning signals 1622 transmit a second report message including the set of measured positioning signals to train the positioning model further based on the set of measured positioning signals

FIG. 16

POSITIONING ENVIRONMENT SIMULATION BASED UPON MODELING

TECHNICAL FIELD

The present disclosure relates generally to communication systems, and more particularly, to a positioning system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE), a positioning reference unit (PRU), a network node, a base station, a transmission reception point (TRP), a network entity, or a location management function (LMF). The apparatus may receive environment information associated with an area. The apparatus may simulate a set of positioning measurements based on the environment information. The apparatus may calculate a positioning environment based on the simulated set of positioning measurements. The apparatus may calculate the positioning environment further based on a set of measured positioning signals obtained by the apparatus, for example received from another apparatus or measured by the apparatus. The apparatus may output the positioning environment to train a positioning model. The apparatus may output the positioning environment by training the positioning model at the apparatus based on the positioning environment. The apparatus may output the positioning environment by transmitting the positioning environment to a training entity to train the positioning model.

In an aspect of the disclosure, a method, a computer-readable medium, and an apparatus are provided. The apparatus may include a UE, a PRU, a base station, a network node, a TRP, a network entity, or an LMF. The apparatus may receive an indicator of a request for environment information associated with an area. The apparatus may transmit, in response to the request, the environment information associated with the area to train a positioning model based on simulated positioning measurements based on the environment information.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a diagram illustrating an example of positioning based on positioning signal measurements.

FIG. 12 is a connection flow diagram illustrating an example of signaling for calculating a positioning environment based on simulated positioning measurements.

FIG. 13 is a flowchart of a method of wireless communication.

FIG. 16 is a flowchart of a method of wireless communication.

DETAILED DESCRIPTION

Figure 1:
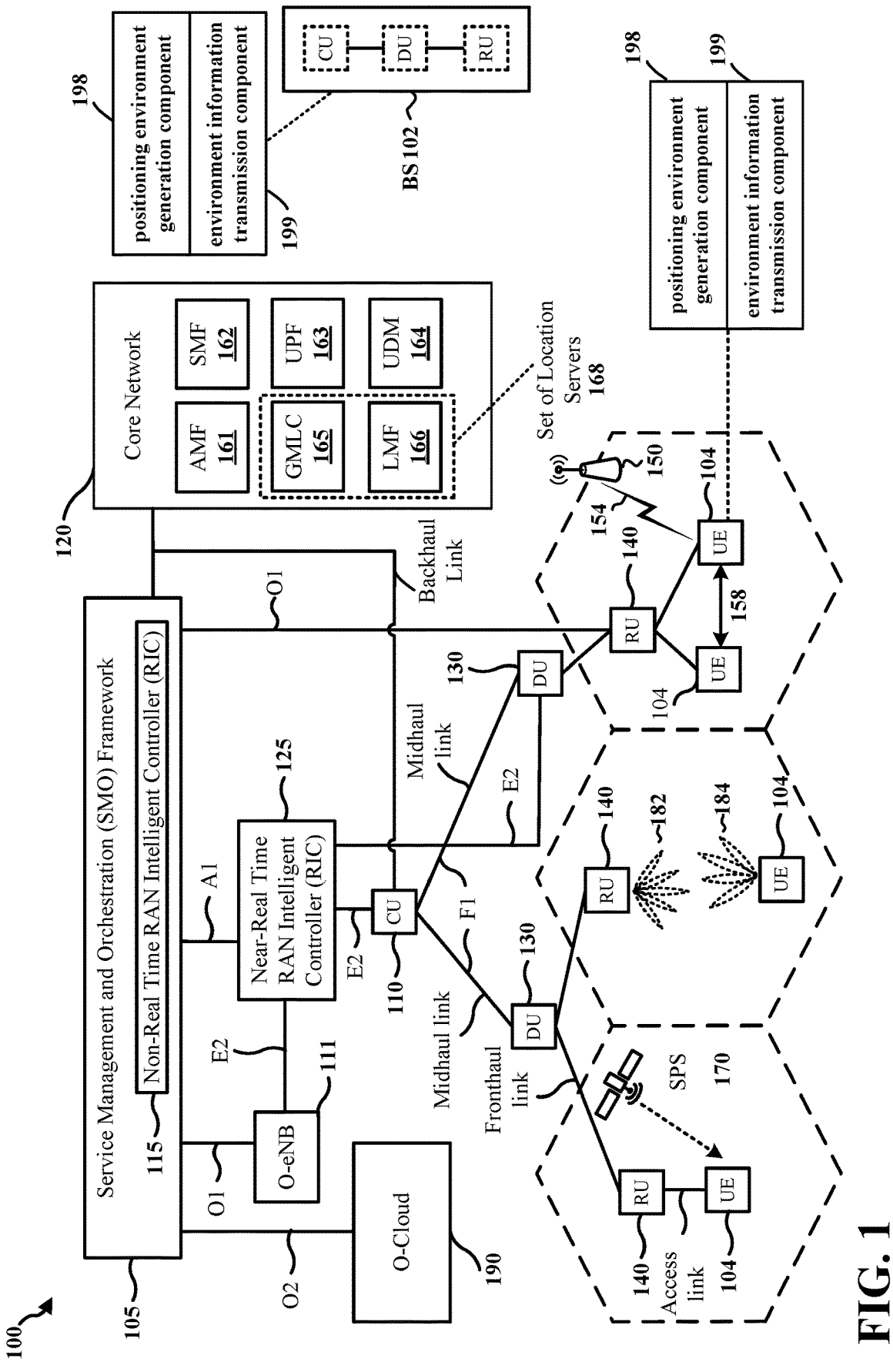
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network. In some aspects, a device, system, or network may be configured to transmit and receive other electromagnetic (EM) signals, for example infrared, visible light, or ultraviolet waves.

Various aspects relate generally to a positioning system. Some aspects more specifically relate to a positioning system that trains positioning models, such as artificial intelligence machine learning (AI/ML) positioning models, for calculating the location of a wireless device. In some examples, a wireless device may receive environment information associated with an area. The wireless device may simulate a set of positioning measurements based on the environment information. The wireless device may calculate a positioning environment based on the simulated set of positioning measurements. The wireless device may calculate the positioning environment further based on a set of measured positioning signals obtained by the apparatus, for example received from another wireless device or measured by the wireless device. The wireless device may output the positioning environment to train a positioning model. The wireless device may output the positioning environment by training the positioning model at the wireless device based on the positioning environment. The wireless device may output the positioning environment by transmitting the positioning environment to a training entity to train the positioning model. The wireless device may include a user equipment (UE), a positioning reference unit (PRU), a network node, a base station, a transmission reception point (TRP), a network entity, or a location management function (LMF). In some examples, a wireless device may receive an indicator of a request for environment information associated with an area. The wireless device may transmit, in response to the request, the environment information associated with the area to train a positioning model based on simulated positioning measurements based on the environment information.

In some aspects, a wireless device (e.g., a UE or an LMF) may generate synthetic training data (i.e., positioning signal measurements) based on knowledge of an indoor environment (i.e., environment information). The environment information may be saved, for example, as a three-dimensional (3D) computer-aided design (CAD) model. In some aspects, the positioning signal measurements may include measurements of EM waves, for example RF waves, infrared waves, visual waves, and/or ultraviolet waves. In other words, the synthetic training data may include measurements for RF positioning. RF sensing, and/or visual positioning. In some aspects, the wireless device may combine the environment information with non-synthetic field measurements to generate a hybrid data set. In some aspects, a wireless device (e.g., a UE) may request environment information (e.g., as CAD model information) from another wireless device (e.g., an LMF). The requesting wireless device may provide supported model formats (e.g., a set of UE-supported CAD models), and/or dimension attributes (e.g., latitude, longitude, elevation) for which the environment information is requested. The requesting wireless device may also provide a location of the wireless device, or an area of interest associated with the wireless device. The responding wireless device may provide the environment information, and the requesting wireless device may use the provided environment information to generate training data. The training data may be used to train a positioning model (e.g., an AI/ML model) for positioning. Any wireless device may be configured to provide environment information to any other wireless device, for example a UE may provide environment information in the form of a CAD model to an LMF.

Particular aspects of the subject matter described in this disclosure can be implemented to realize one or more of the following potential advantages. In some examples, by configuring a wireless device to simulate a set of positioning measurements based on environment information, and then calculate a positioning environment for training a positioning model, the described techniques can be used to obtain training data from a site/area that is inaccessible, or otherwise is in an environment where testing data collection is limited or impossible. The training data may then be used to train a positioning model, such as an AI/ML positioning model, for improving positioning at the wireless device. The simulated positioning measurement data may be combined with non-simulated measured positioning signal data to generate a positioning environment using both simulated and non-simulated (i.e., hybrid) data. As conducting measurement campaigns in all areas may not be feasible with all wireless devices (e.g., the existence of immobile furniture or machinery in the way, the lack of rights to access an area, the difficulty in accessing an area with a wireless device), simulating measurements may be advantageous in training a positioning model.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs.

Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and back- ⁵ haul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggre- ¹⁰ gated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) ¹⁵ 163, a Unified Data Management (UDM) 164, one or more location servers 168, and other functional entities. The AMF 161 is the control node that processes the signaling between the UEs 104 and the core network 120. The AMF 161 supports registration management, connection management, ²⁰ mobility management, and other functions. The SMF 162 supports session management and other functions. The UPF 163 supports packet routing, packet forwarding, and other functions. The UDM 164 supports the generation of authentication and key agreement (AKA) credentials, user identi- ²⁵ fication handling, access authorization, and subscription management. The one or more location servers 168 are illustrated as including a Gateway Mobile Location Center (GMLC) 165 and a Location Management Function (LMF) 166. However, generally, the one or more location servers ³⁰ 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE ³⁵ location services. The GMLC 165 provides an interface for clients/applications (e.g., emergency services) for accessing UE positioning information. The LMF 166 receives measurements and assistance information from the NG-RAN and the UE 104 via the AMF 161 to compute the position of ⁴⁰ the UE 104. The NG-RAN may utilize one or more positioning methods in order to determine the position of the UE 104. Positioning the UE 104 may involve signal measurements, a position estimate, and an optional velocity computation based on the measurements. The signal measure- ⁴⁵ ments may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial net- ⁵⁰ work (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR ⁵⁵ signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors. ⁶⁰

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game ⁶⁵ console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 and/or the base station 102 may have a positioning environment generation component 198 that may be configured to receive environment information associated with an area. The positioning environment generation component 198 may be configured to simulate a set of positioning measurements based on the environment information. The positioning environment generation component 198 may be configured to calculate a positioning environment based on the simulated set of positioning measurements. The positioning environment generation component 198 may be configured to calculate the positioning environment further based on a set of measured positioning signals obtained by the positioning environment generation component 198, for example received from another UE 104/base station 102 or measured by the UE 104/base station 102. The positioning environment generation component 198 may be configured to output the positioning environment to train a positioning model. The positioning environment generation component 198 may be configured to output the positioning environment by training the positioning model at the UE 104/base station 102 based on the positioning environment. The positioning environment generation component 198 may be configured to output the positioning environment by transmitting the positioning environment to a training entity to train the positioning model. In certain aspects, the UE 104 and/or the base station 102 may have an environment information transmission component 199 that may be configured to receive an indicator of a request for environment information associated with an area. The environment information transmission component 199 may be configured to transmit, in response to the request, the environment information associated with the area to train a positioning model based on simulated positioning measurements based on the environment information.

Figure 2:
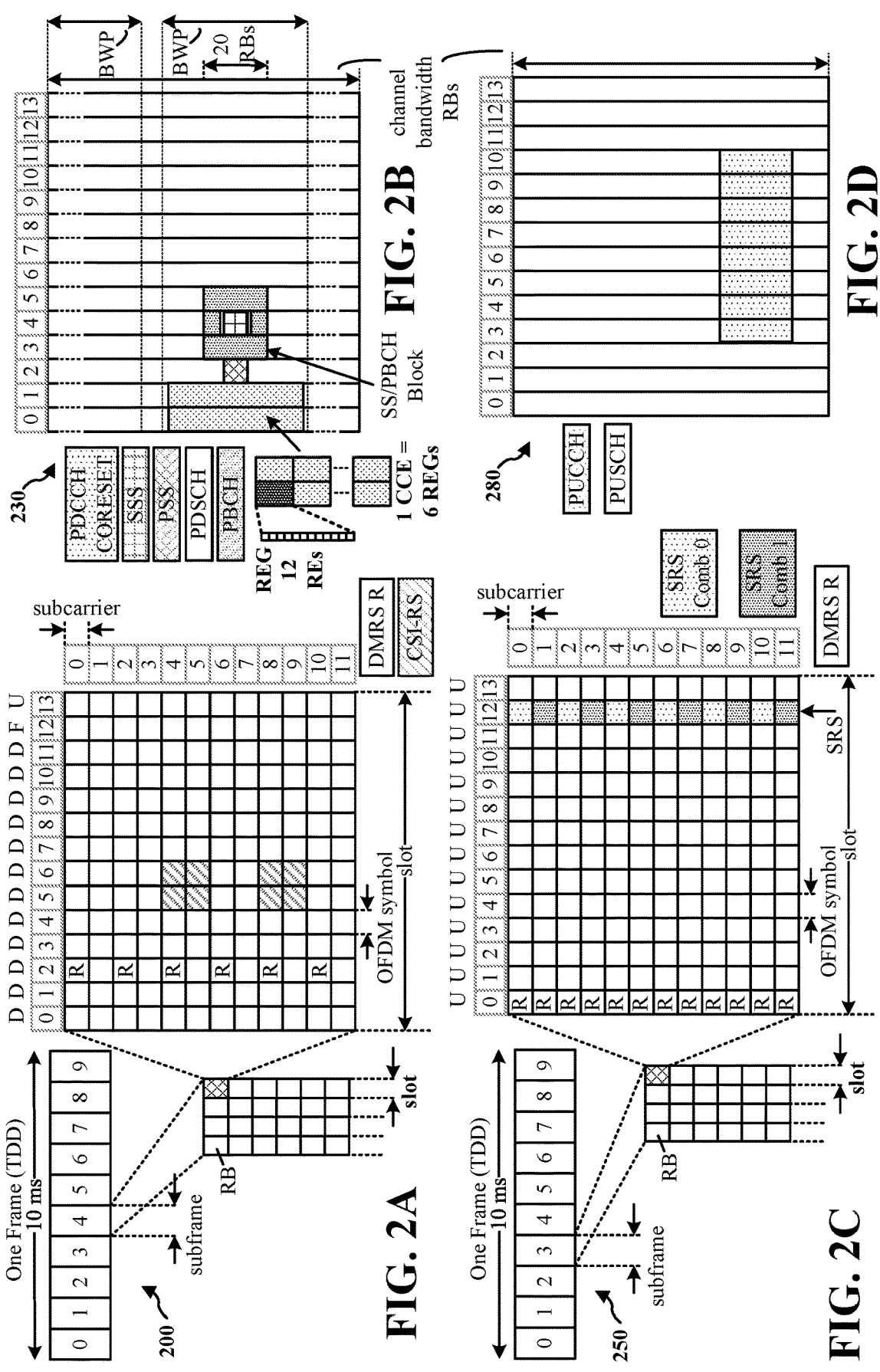
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A. 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| $\mu$ | SCS $\Delta f = 2^\mu \cdot 15[KHz]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
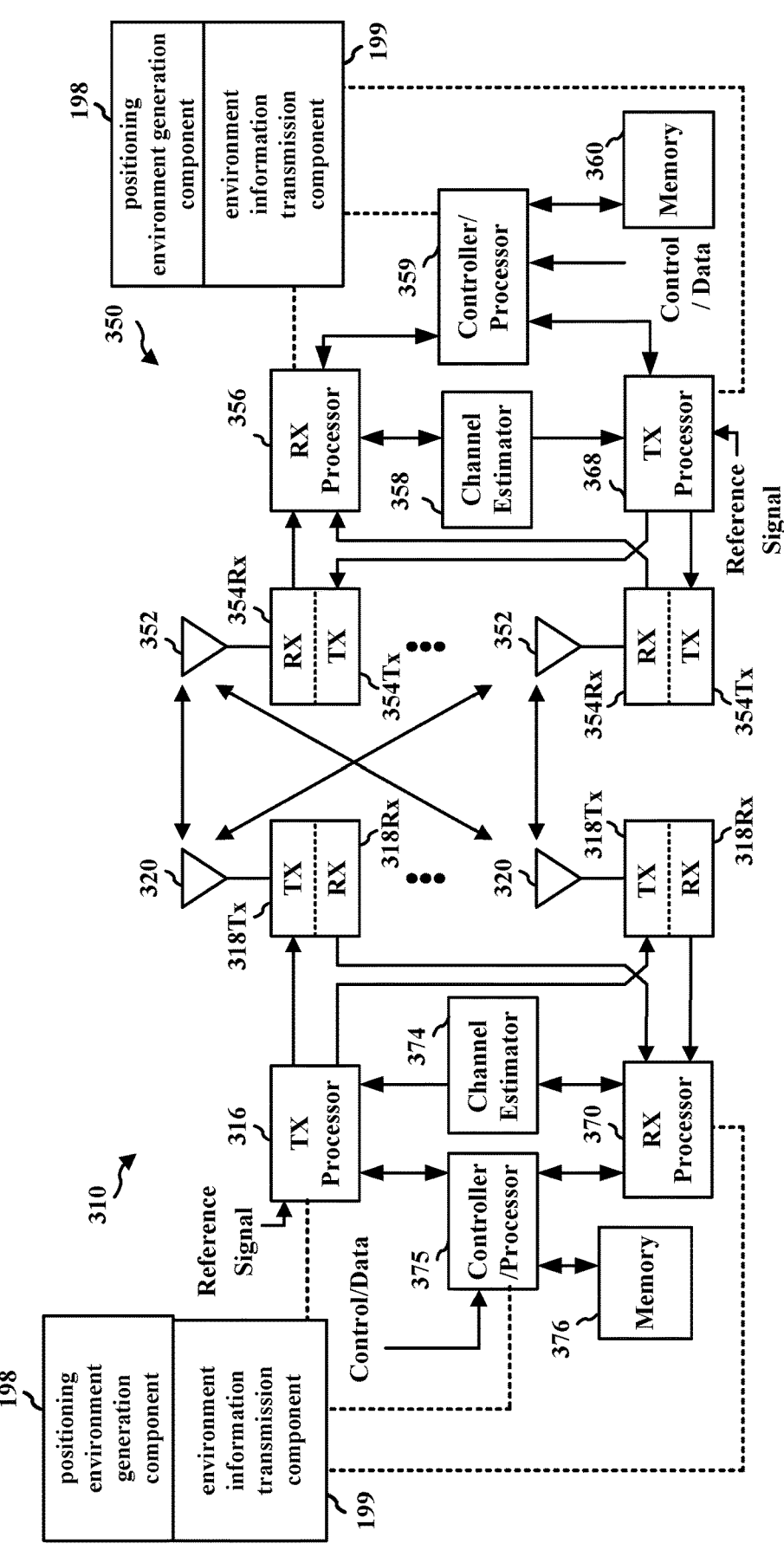
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the positioning environment generation component 198 of FIG. 1.

At least one of the TX processor 368, the RX processor 356, and the controller/processor 359 may be configured to perform aspects in connection with the environment information transmission component 199 of FIG. 1.

At least one of the TX processor 316, the RX processor 370, and the controller/processor 375 may be configured to perform aspects in connection with the positioning environment generation component 198 of FIG. 1.

At least one of the TX processor 316, the RX processor 370, and the controller/processor 375 may be configured to perform aspects in connection with the environment information transmission component 199 of FIG. 1.

Figure 4:
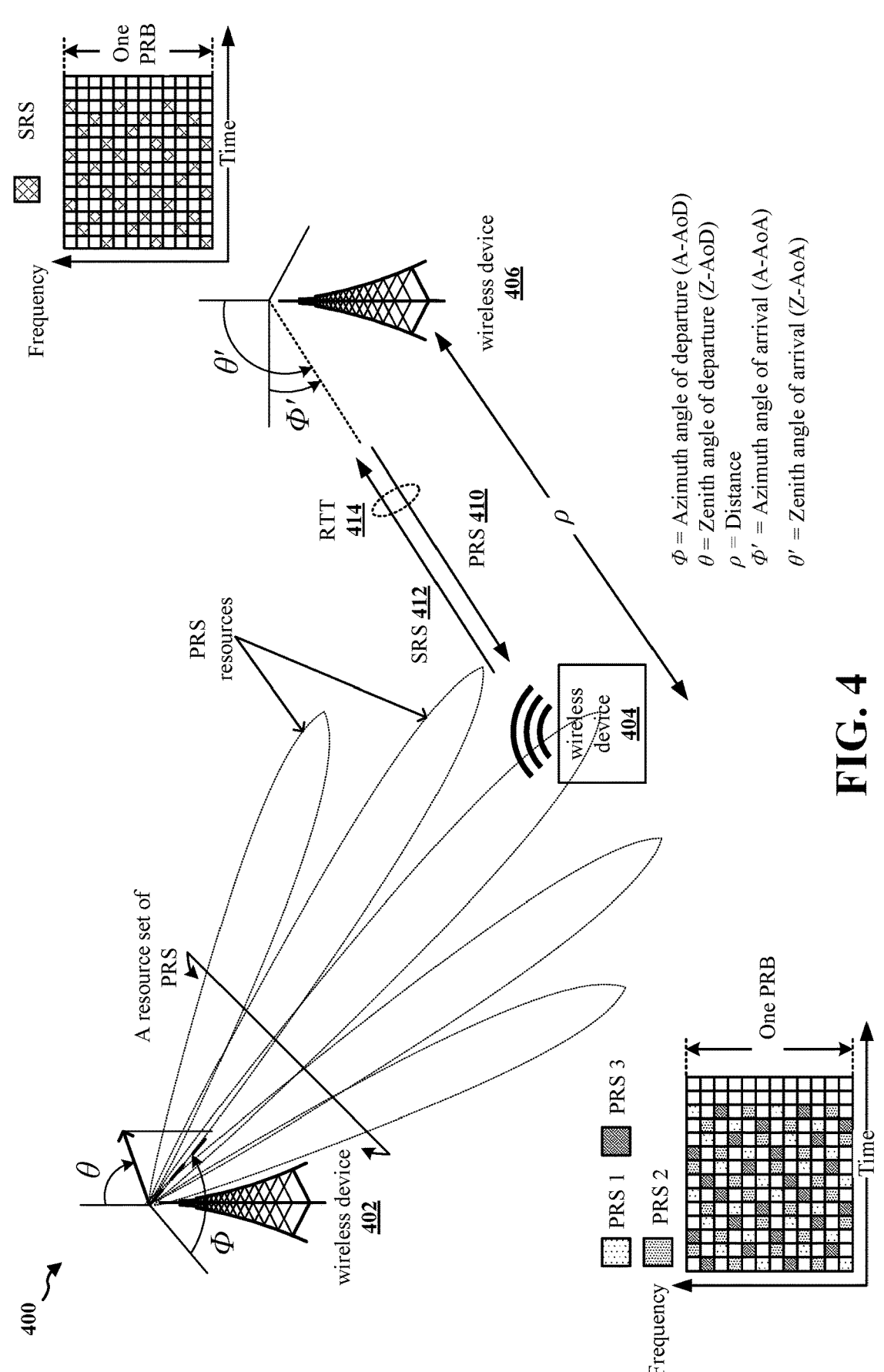
FIG. 4 is a diagram illustrating an example of positioning based on positioning signal measurements.

FIG. 4 is a diagram 400 illustrating an example of a positioning based on positioning signal measurements. A positioning signal may be any reference signal which may be measured to calculate a position attribute or a location attribute of a wireless device, for example a positioning reference signal (PRS), a sounding reference signal (SRS), a channel state information (CSI) reference signal (CSI-RS), or a synchronization and signal block (SSB). The wireless device 402 may be a base station, such as a TRP, or a UE with a known position/location, such as a positioning reference unit (PRU) or a UE with a high-accuracy sensor that may identify the location of the UE, for example a GNSS sensor or a GPS sensor. The wireless device 406 may be a base station or a UE with a known position/location. The wireless device 404 may be a UE or a TRP configured to perform positioning to gather data, for example to gather data to train an artificial intelligence machine learning (AI/ML or AIML) model, test positioning signal strength or test positioning noise attributes in an area. The wireless device 404 may transmit UL-SRS 412 at time $T_{SRS\_TX}$ and receive DL positioning reference signals (PRS) (DL-PRS) 410 at time $T_{PRS\_RX}$. The wireless device 406 may receive the UL-SRS 412 at time $T_{SRS\_RX}$ and transmit the DL-PRS 410 at time $T_{PRS\_TX}$. The wireless device 404 may receive the DL-PRS 410 before transmitting the UL-SRS 412, or may transmit the UL-SRS 412 before receiving the DL-PRS 410. In both cases, a positioning server (e.g., location server(s) 168, LMF 166) or the wireless device 404 may determine the RTT 414 based on $\|T_{SRS\_RX}-T_{PRS\_TX}\|-$ $\|T_{SRS\_TX}-T_{PRS\_RX}\|$. Accordingly, multi-RTT positioning may make use of the UE Rx-Tx time difference measurements (i.e., $\|T_{SRS\_TX}-T_{PRS\_RX}\|$) and DL-PRS reference signal received power (RSRP) (DL-PRS-RSRP) of downlink signals received from multiple wireless device 402, 406 and measured by the wireless device 404, and the measured TRP Rx-Tx time difference measurements (i.e., $\|T_{SRS\_RX}-T_{PRS\_TX}\|$) and UL-SRS-RSRP at multiple wireless devices 402, 406 of uplink signals transmitted from wireless device

404. The wireless device 404 may measure the UE Rx-Tx time difference measurements (and optionally DL-PRS-RSRP of the received signals) using assistance data received from the positioning server, and the wireless devices 402, 406 may measure the gNB Rx-Tx time difference measurements (and optionally UL-SRS-RSRP of the received signals) using assistance data received from the positioning server. The measurements may be used at the positioning server or the wireless device 404 to determine the RTT. The RTT may be used to estimate the location of the wireless device 404. Other methods are possible for determining the RTT, such as for example using DL-TDOA and/or UL-TDOA measurements.

DL-AoD positioning may make use of the measured DL-PRS-RSRP of downlink signals received from multiple wireless devices 402, 406 at the wireless device 404. The wireless device 404 may measure the DL-PRS-RSRP of the received signals using assistance data received from the positioning server, and the resulting measurements may be used along with the azimuth angle of departure (A-AoD), the zenith angle of departure (Z-AoD), and/or other configuration information to locate the wireless device 404 in relation to the neighboring wireless devices 402, 406.

DL-TDOA positioning may make use of the DL reference signal time difference (RSTD) (and optionally DL-PRS-RSRP) of downlink signals received from multiple wireless devices 402, 406 at the wireless device 404. The wireless device 404 may measure the DL RSTD (and optionally DL-PRS-RSRP) of the received signals using assistance data received from the positioning server, and the resulting measurements may be used along with other configuration information to locate a position/location the wireless device 404 in relation to the neighboring wireless devices 402, 406.

UL-TDOA positioning may make use of the UL relative time of arrival (RTOA) (and optionally UL-SRS-RSRP) at multiple wireless devices 402, 406 of uplink signals transmitted from wireless device 404. The wireless devices 402, 406 may measure the UL-RTOA (and optionally UL-SRS-RSRP) of the received signals using assistance data received from the positioning server, and the resulting measurements may be used along with other configuration information to estimate the location of the wireless device 404.

UL-AoA positioning may make use of the measured azimuth angle of arrival (A-AoA) and zenith angle of arrival (Z-AoA) at multiple wireless devices 402, 406 of uplink signals transmitted from the wireless device 404. The wireless devices 402, 406 may measure the A-AoA and the Z-AoA of the received signals using assistance data received from the positioning server, and the resulting measurements may be used along with other configuration information to estimate the location of the wireless device 404.

Additional positioning methods may be used for estimating the location of the wireless device 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

FIG. 5 is a diagram 500 illustrating a network entity 508 that may be configured to coordinate a wireless device 502 and a wireless device 506 to perform positioning with a wireless device 504. The location of the wireless device 502 and the wireless device 506 may be known to at least one device, such as the wireless device 502, the wireless device 504, the wireless device 506, and/or the network entity 508. The wireless device 502 may be a base station, a gNB, or a TRP. The wireless device 506 may be a base station, a gNB, or a TRP. The wireless device 504 may be a UE. In some aspects, the UE may be a PRU. A PRU may be a UE with a known location. For example, the PRU may be affixed in a known location or may be placed in a known location for a period of time, or the PRU may have a set of sensors (e.g., a high-accuracy GNSS sensor) that may be used to accurately calculate the location of the PRU. The network entity 508 may be connected to the wireless device 502 and the wireless device 506 via a physical link, for example a backhaul link or a midhaul link, or via a wireless link, such as an air interface (a UE-UTRAN (Uu)) link. The network entity 508 may be part of a core network, such as an LMF or a set of location servers. The network entity 508 may configure positioning occasions between the wireless device 502, the wireless device 504, and the wireless device 506.

To perform positioning, the network entity 508 may configure one or more of the wireless devices to transmit positioning signals at one another. For example, the wireless device 504 may transmit the set of positioning signals 512 at the wireless device 502. The set of positioning signals 512 may be a set of SRSs, SSBs, or CSI-RSs. The wireless device 502 may measure the set of positioning signals 512. The wireless device 502 may transmit the set of positioning signals 516 at the wireless device 504. The set of positioning signals 516 may be a set of PRSs, SSBs, or CSI-RSs. The wireless device 504 may measure the set of positioning signals 516. The wireless device 504 may transmit a set of positioning signals 514 at the wireless device 506. The set of positioning signals 514 may be a set of SRSs, SSBs, or CSI-RSs. The wireless device 506 may measure the set of positioning signals 514. The wireless device 506 may transmit a set of positioning signals 518 at the wireless device 504. The set of positioning signals 518 may be a set of PRSs, SSBs, or CSI-RSs. The wireless device 504 may measure the set of positioning signals 518. One or more of the wireless devices may measure the received positioning signals to calculate a positioning measurement that may be used to calculate a position/location of the wireless device 504, or may be used to calculate a position/location of the wireless device 504. For example, if the location of the wireless device 502 and the location of the wireless device 506 are known, the location of the wireless device 504 may be calculated based on a RTT between the wireless device 502 and the wireless device 504, and a RTT between the wireless device 504 and the wireless device 506. In another example, the wireless device 504 may calculate an angle of arrival (AoA) or an angle of departure (AoD) of the set of positioning signals 516, and may calculate an AoA or an AoD of the set of positioning signals 518. The calculated AoAs and/or AoDs may be used to calculate a position of the wireless device 504 if the location of the wireless device 502 and the location of the wireless device 506 are also known. Other measurements, such as RTOA, line-of-sight (LOS) identification (identifying whether there is a direct line-of-sight path between wireless devices), or multi-cell round trip time (multi-RTT) calculations may be performed to calculate the position of the wireless device 504, or to calculate a measurement that may be used to calculate the position of the wireless device 504.

In some aspects, a positioning model may be used to calculate one or more positioning metrics based on the measurements. For example, based on the measurements of the set of positioning signals 512 and/or the set of positioning signals 514 transmitted by the wireless device 504, a position/location of the wireless device 504 may be calculated or estimated, or an intermediate measurement that may be used to calculate the position/location of the wireless device 504 may be calculated or estimated. A positioning model may be trained using artificial intelligence (AI)/ machine learning (ML) (AI/ML or AIML), based on a set of inputs (e.g., measurements of positioning signals, assistance information associated with the positioning signals) and a set of labels. A positioning signal may include any reference signal transmitted from a wireless device, such as a PRS, a SRS, an SSB, or a CSI-RS. An RS transmitted from a UE, such as a PRU, may be referred to as an uplink positioning signal, or an UL positioning signal. An RS transmitted from a base station, or TRP, may be referred to as a downlink positioning signal, or a DL positioning signal. A measurement may be a channel delay profile (DP), a channel power delay profile (PDP), a channel impulse response (CIR), a channel frequency response (CFR), or other measurement used for performing positioning on a target wireless device. A label may be a calculated, derived, or given (i.e., known) expected result associated with a set of inputs, such as a position/location of a wireless device 504 or an intermediate measurement (e.g., a timing measurement, an angle measurement, a LOS identification) that may be used to calculate the position/location of the wireless device 504. A set of inputs and a set of labels may be used for generating and/or training a positioning model using AI/ML.

When training a positioning model, measurements of positioning signals as inputs, clean or noisy labels (clean labels may have a quality metric greater or equal to a threshold, noisy labels may have a quality metric less than or equal to the threshold) as expected outputs, and training data assistance information as inputs or expected outputs. The positioning model may operate on any wireless device based on a set of inputs. For example, the wireless device 502 may have a positioning model configured to accept a set of positioning measurements and generate an estimate of a position/location of the wireless device 504. In another example, the wireless device 502 may have a positioning model configured to accept a set of positioning measurements and generate an intermediate measurement (e.g., a timing measurement, an angle measurement, a LOS identification) that may be used (by the wireless device 502, or another entity, such as the network entity 508, the wireless device 504, or the wireless device 506) to calculate the position/location of the wireless device 504. In another example, the network entity 508 may have a positioning model configured to accept a set of positioning measurements and generate an estimate of a position/location of the wireless device 504, or generate an intermediate measurement that may be used to calculate the position/location of the wireless device 504. In another example, the wireless device 504 may have a positioning model configured to accept a set of positioning measurements and generate an estimate of a position/location of the wireless device 504, or generate an intermediate measurement that may be used to calculate the position/location of the wireless device 504. In some aspects, the positioning measurements may be aggregated by the entity with the positioning model, for example the network entity 508 may aggregate measurements of the set of positioning signals 512 from the wireless device 502, measurements of the set of positioning signals 514 the wireless device 506 to use as inputs to a positioning model, measurements of the set of positioning signals 516 from the wireless device 504, and/or measurements of the set of positioning signals 518 from the wireless device 504.

A positioning model may be trained on a wireless device that performs positioning, such as the wireless device 502, the wireless device 504, the wireless device 506 and/or the network entity 508, or may be trained on an offline device, such as an over-the-top (OTT) server. The inputs to the positioning model may include measurements of positioning signals, such as measurements of SRS, PRS, SSB, and/or CSI-RS. The inputs to the measurements may include assistance information associated with the measured positioning signals, such as BWP of a positioning signal resource, number of TRPs, beam information, positioning signal configuration). The labels/outputs for the positioning model may include a location, or an intermediate measurement.

In some aspects, a positioning model may be configured to use measurements of positioning signals transmitted from a wireless device to calculate a position of the wireless device 504, or to calculate an intermediate measurement that may be used to calculate the position of the wireless device 504. The positioning model may be trained via a training entity, and may be used at the wireless device 502, at the wireless device 504, at the wireless device 506, or at the network entity 508. For example, a positioning model at the wireless device 504 may be configured to calculate the location of the wireless device 504 based on measurements of the set of positioning signals 516 and/or the set of positioning signals 518. In another example, the wireless device 502 may transmit a set of intermediate measurements to the network entity 508 so that the network entity 508 may calculate the location of the wireless device 504 based on the set of intermediate measurements. In another example, the wireless device 504 may transmit measurements of the set of positioning signals 516 and/or the set of positioning signals 518 to the network entity 508. The positioning model may be at the network entity 508. The positioning model at the network entity 508 may calculate the location of the wireless device 504 based on the transmitted measurements of the set of positioning signals 516 and/or the set of positioning signals 518 from the wireless device 504, the transmitted measurements of the set of positioning signals 512 from the wireless device 502, and/or the transmitted measurements of the set of positioning signals 514 from the wireless device 506. In other words, any of the wireless device 502, the wireless device 504, and/or the wireless device 506 may assist the network entity 508 in performing positioning using a trained positioning model.

In some aspects, a positioning model may be site-specific. For example, a first positioning model may be trained in a location, or a set of locations, associated with a first site having a first set of borders, and a second positioning model may be trained in a location, or a set of locations, associated with a second site having a second set of borders. A wireless device may be configured to use one of a plurality of site-specific positioning models. For example, the wireless device may select a site-specific positioning model based on its location, or may select a site-specific positioning model based on an indicator, for example a signal transmitted from the network entity 508 that indicates that a particular site-specific positioning model from a plurality of site-specific positioning models be selected.

Measurements of positioning signals may be performed by measuring channels between a target device (e.g., the wireless device 504) and a set of network nodes (e.g., the wireless device 502 and the wireless device 506). The wireless device 504 may transmit a positioning signal, such as an SRS, an SSB, or a CSI-RS. The wireless device 502 and/or the wireless device 506 may measure the positioning signal for data collection purposes to train a positioning model. The wireless device 504 and/or the wireless device 506 may transmit a positioning signal, such as a PRS, an SSB, or a CSI-RS. The wireless device 504 may measure the positioning signal for data collection purposes to train the positioning model. The wireless device 502, the wireless device 504, and/or the wireless device 506 may measure a positioning signal resource in a plurality of ways, for example the measurement may be a channel impulse response (CIR), a channel frequency response (CFR), a power delay profile (PDP), a delay profile (DP), a set of reflection paths, a reception-transmission (Rx-Tx) time difference, a received signal strength indicator (RSSI), a reference signal received power (RSRP), a reference signal received power per path (RSRPP), a reference signal received quality (RSRQ), a time of arrival (ToA), a reference signal time difference (RSTD), or an angle of departure (AoD).

While the diagram 500 illustrates two positioning neighbor wireless devices, wireless device 502 and wireless device 506, configured to perform positioning with one positioning target wireless device, wireless device 504, to calculate a position/location of the wireless device 504, any number of positioning neighbor wireless devices may be configured to perform positioning with any number of positioning target wireless devices. For example, four positioning neighbor wireless devices may be configured to calculate the position/location of two positioning target wireless devices, three positioning neighbor wireless devices may be configured to calculate the position/location of one positioning target wireless device, or two positioning neighbor wireless devices may be configured to calculate the position/location of one positioning target wireless device.

In some aspects, the measurements collected by a wireless device may not be adequate to train a positioning model for an area. For example, the wireless device may not have access to an area to collect positioning signal measurements, or the area may have a plurality of obstacles that block or interfere with positioning signal measurements. In some aspects, a wireless device may be configured to simulate positioning signal measurements based on environment information of an area, for example a set of dimension attributes for an object within the area (e.g., width, height, length, shape, center of mass), a set of material attributes for an object within the area (e.g., composition of materials, reflective properties of the material, refractive properties of the material, absorptive properties of the material, diffractive properties of the material, scattering properties of the material), and/or a set of location attributes for an object within the area (e.g., coordinates, latitude, longitude, elevation). In some aspects, the wireless device may leverage knowledge on the structure of an indoor environment, to generate synthetic training data (e.g., using a ray tracing methodology). In some aspects, the wireless device may combine synthetic data with a set of field measurements (e.g., the field measurements may be limited in time, location, and/or resources) and may consider a hybrid dataset construction. In some aspects, the wireless device may receive a 3D model of an area (e.g., a 3D indoor environment) from another wireless device. For example, the wireless device 504 may receive a 3D model of environment information from the wireless device 502 and/or the network entity 508, the wireless device 504 may receive a 3D model of environment information from the wireless device 502 and/or network entity 508, or the network entity 508 may receive a 3D model of environment information from the wireless device 502 and/or the wireless device 504.

In some aspects, a UE (e.g., a UE, a PRU) may request and receive a 3D model (e.g., a CAD model) of an area (e.g., indoor environment) from a network entity (e.g., location servers, LMF) via LPP signaling (e.g., as part of LPP assistance data request messaging). The network entity may transmit the 3D model as part of LPP assistance data response messaging, or via an LPP broadcast message (e.g., positioning system information block (posSIB)).

Figure 6:
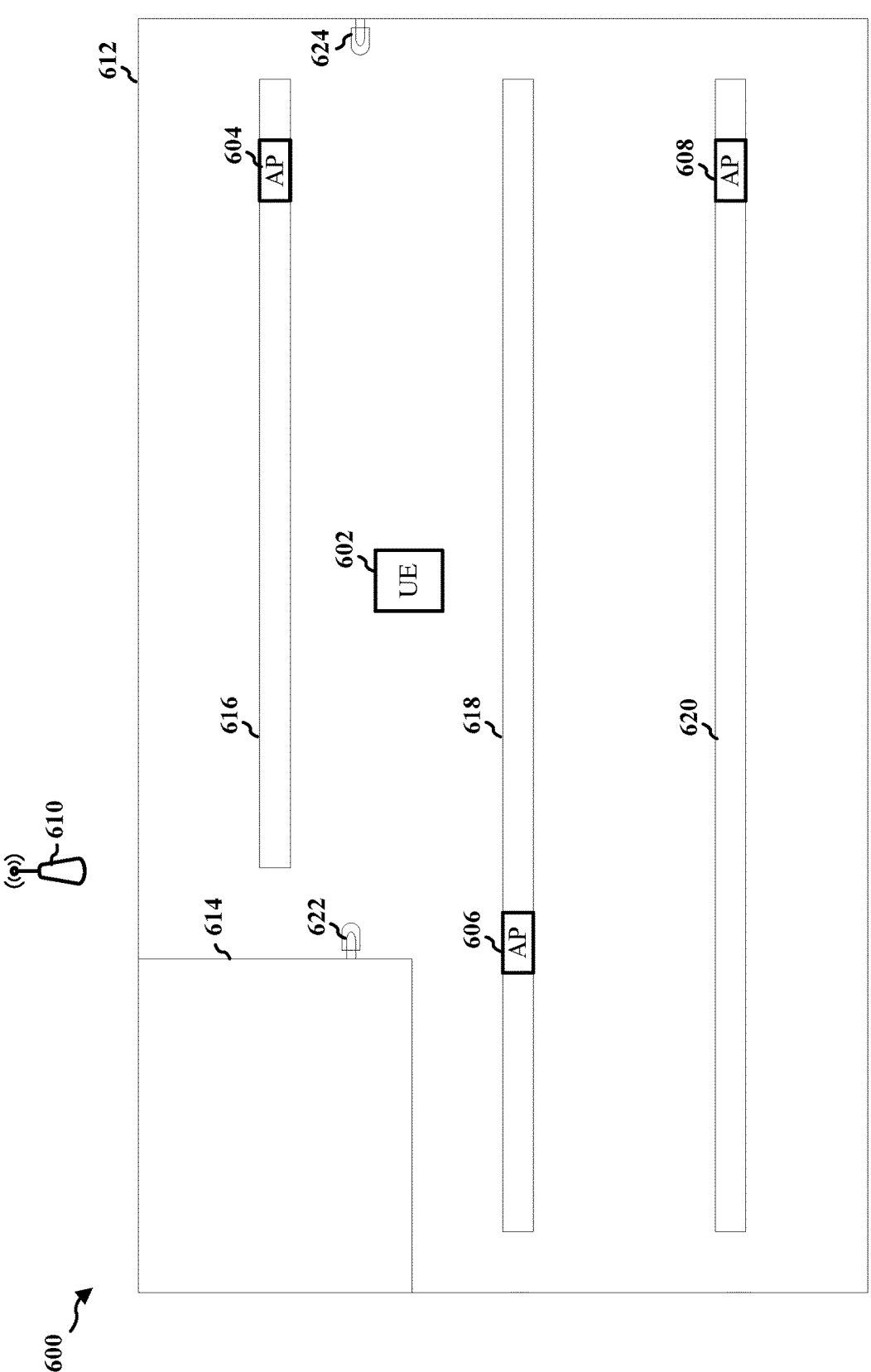
FIG. 6 is a diagram illustrating an example of an area having an environment that could be used to train a positioning model.

FIG. 6 is a diagram 600 illustrating an example of an area 612 having an environment that could be used to train a positioning model. While the area 612 is shown as an indoor area with a barrier 614 and shelves 616, shelves 618, and shelves 620, any area with any number and arrangement of objects may be used as an environment that may be used to train a positioning model. Any wireless device may be configured to collect data to train the positioning model, for example the UE 602, the AP 604, the AP 606, the AP 608, and/or the base station 610. The UE 602 may be a UE configured to collect positioning measurements at different areas of the area 612. The UE 602 may be a PRU configured to be placed in a location to collect positioning measurements in the known location that the PRU is placed. The base station 610 may be a TRP configured to transmit and/or receive positioning signals for training a positioning model.

In some aspects, a wireless device may be configured to measure positioning signals of EM waves that are not RF waves, for example infrared waves, visual waves, or ultraviolet waves. In some aspects, the positioning signals may originate from a light source 622 or a light source 624, which may emanate EM waves, for example visual light waves, which may reflect off of objects, for example the shelves 616 and/or the shelves 618, which may be received by a wireless device, for example the UE 602. In some aspects, a positioning signal may originate from the wireless device measuring the positioning signal. For example, the UE 602 may have a light source configured to transmit visual light which may reflect off of the shelves 616 and/or the shelves 618, to be received by the UE 602, or may have an antenna configured to transmit RF signals which may reflect off of the shelves 616 and/or the shelves 618, to be received by the UE 602. The UE 602 may simulate determining its location or position (i.e., location and orientation) based on RF positioning measurements, RF sensing measurements, and/or visual positioning measurements. The UE 602 may calculate the location or position of the UE 602 based on the RF positioning measurements and known locations/orientations of RF transmitters and/or RF receivers. The UE 602 may calculate the location or position of the UE 602 based on the RF sensing measurements and known locations/orientations of RF transmitters and/or RF receivers. The UE 602 may calculate the location or position of the UE 602 based on the visual positioning measurements and a database of known locations/orientations of objects having a visual fingerprint. The UE 602 may utilize a positioning model to calculate at least the location of the UE 602, the orientation of the UE 602, and/or an intermediate measurement that may be used to calculate a location/orientation of the UE 602.

A wireless device may have environment information associated with the area 612, for example the dimension attributes, material attributes, and/or location attributes of a building (the walls, the floor, the ceiling) for the area 612, the dimension attributes, material attributes, and/or location attributes of the barrier 614 (e.g., a room with walls that have RF shielding), and/or the dimension attributes, material attributes, and/or location attributes of the shelves 616, shelves 618, and shelves 620. The wireless device may save the environment information in a 3D model saved on a memory of the wireless device, for example as an architectural CAD model. The 3D model may be saved as, for example, a drawing (DWG) format (e.g., *.dwg), a drawing exchange format (e.g., *.dxf), a design format (e.g., *.dgn), a Revit family file format (e.g., *.rfa), or a plan format (e.g.,

*.pln). A wireless device may transmit the environment information to another wireless device for use in generating a positioning environment for training a positioning model. A positioning environment may be a set of measured positioning attributes associated with an area, for example LOS paths, non-LOS paths, barriers, reflective surfaces, refractive materials, SNR levels, or RF signatures for locations within the area 612. The wireless device may simulate a set of positioning environments based on the environment information. For example, the UE 602 may use a set of environment information associated with the area 612 to simulate receiving a set of positioning signals from the AP 604 and the base station 610, or the base station 610 may use a set of environment information to simulate receiving a set of positioning signals from the UE 602 and/or the AP 606. The wireless device may simulate, for example, a set of specular reflection effects, a set of non-specular reflection effects, a set of refraction effects, a set of diffraction effects, and/or a set of scattering effects based on the environment information. The set of non-specular reflection effects may include, for example, simulations of reflections off of rough surfaces or curved surfaces. The set of refraction effects may include, for example, simulations of an EM wave refracting through a transmissible material (e.g., a glass wall, a dense drywall). A calculated path of a simulated positioning signal may include multiple simulated effects, for example a refraction through one object and a reflection off of another object. In some aspects, the simulated non-specular reflection effects may not follow Snells law. In some aspects, the wireless device may simulate EM waves via a ray-tracing approach/ method. In addition to simulating positioning signals, the wireless device may measure non-simulated positioning signals to enhance its calculated positioning environment. For example, the UE 602 may simulate receiving a set of positioning signals that originate from the base station 610, and may also receive and measure a set of positioning signals that originate from the base station 610, verifying the simulation and providing data for error correction. In another aspect, the UE 602 may simulate receiving a set of positioning signals that originate from the light source 622, and may also receive and measure a set of positioning signals that originate from the light source 622. In some aspects, the UE 602 may measure different types of positioning signals, for example RF positioning signals and visual light positioning signals, and verify the measurements relative to one another. In some aspects, the UE 602 may filter, or prioritize, types of positioning signals based on a measured environmental condition, for example visual light positioning signals may be prioritized in an area with a window during daylight hours, or during time periods with heavy RF interference, or RF positioning signals may be prioritized in an area with a window during nighttime hours, or during time periods with light RF interference.

Figure 7:
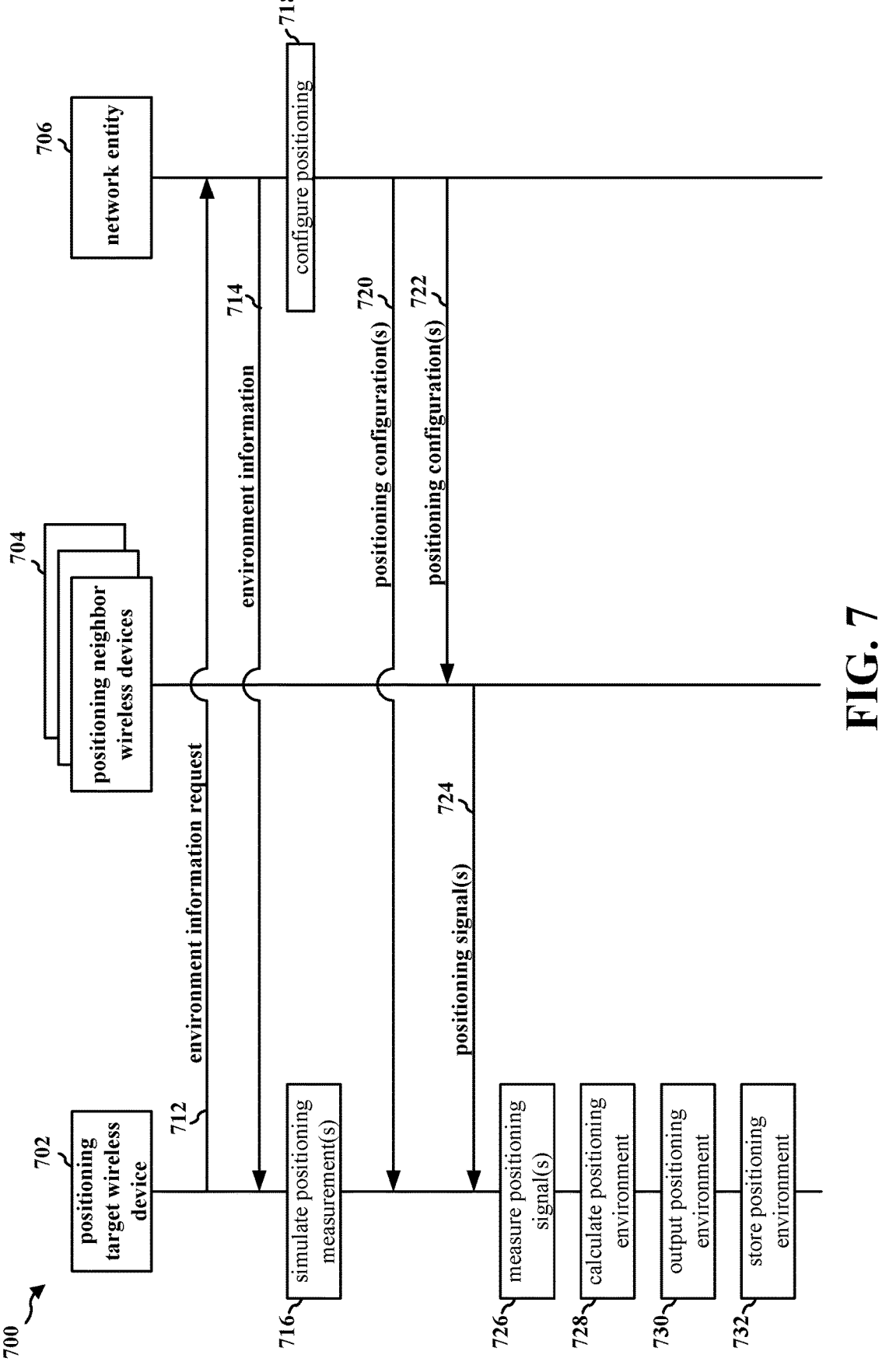
FIG. 7 is a connection flow diagram illustrating an example of signaling for calculating a positioning environment based on simulated positioning measurements.

FIG. 7 is a connection flow diagram 700 illustrating an example of signaling for calculating a positioning environment based on simulated positioning measurements. The connection flow diagram 700 may be an example of communications between a positioning target wireless device 702, a set of positioning neighbor wireless devices 704, and a network entity 706. The positioning target wireless device 702 may be a UE. The UE may be a PRU with a known location. The set of positioning neighbor wireless devices 704 may include a set of base stations and/or a set of TRPs configured to transmit positioning signals at the positioning target wireless device 702. The network entity 706 may include an LMF, may include one or more location servers, or may be a separate cloud server that may be configured to provide environment information. The network entity 706 may be configured to provide environment information associated with an area.

The positioning target wireless device 702 may transmit a request 712 for environment information to the network entity 706. The network entity 706 may receive the request 712 for environment information from the positioning target wireless device 702. The positioning target wireless device 702 may transmit an LPP assistance data request message that includes the request 712 for the environment information. The request 712 may include an indicator of a request for the availability of environment information (e.g., whether the network entity 706 has a 3D model for an area that the positioning target wireless device 702 is located within, or will be placed). The request 712 may include an indicator of a set of model formats (e.g., CAD model formats) that the positioning target wireless device 702 is capable of handling. The request 712 may include an indicator of a model format (e.g., a specific CAD model format) that the positioning target wireless device 702 is capable of handling. The request 712 may include an indicator of a set of limits/ranges (e.g., latitudes, longitudes, elevations) for which the environment information is requested. The request 712 may include an indicator of an estimate of the location of the positioning target wireless device 702 (e.g., a coarse estimate, a fine estimate, a known location).

The network entity 706 may transmit environment information 714 to the positioning target wireless device 702. The positioning target wireless device 702 may receive the environment information 714 from the network entity 706. The network entity 706 may transmit the environment information 714 in response to the request 712. The network entity 706 may transmit the environment information 714 based on the request 712, for example by selecting a set of environment information, or a plurality of sets of environment information, to transmit to the positioning target wireless device 702 based on corresponding indicators in the request 712. The environment information 714 may include a 3D model of the requested area, for example as a CAD file or a CAD model. The environment information 714 may include an indicator that the network entity 706 has available models for the positioning target wireless device 702. The environment information 714 may include an indicator of access rights that the network entity 706 grants to the positioning target wireless device 702, or access rights that the positioning target wireless device 702 should have in order to access the environment information 714. The environment information 714 may include an indicator of a link to a file containing the requested information. The environment information 714 may include a description of what is within the file, for example limits/ranges of the information within the file, or available model formats that have the information. The environment information 714 may include an indicator of a 3D model, such as a unique identifier or an identifier of the type of file of the 3D model. The environment information 714 may include an indicator of how wireless devices with known locations (e.g., TRPs, APs, PRUs) map to the area associated with the model.

In some aspects, the environment information 714 may include indicators of a plurality of sets of environment information associated with a plurality of areas. In other words, the network entity 706 may be capable of transmitting a set of environment information for each of a plurality of areas. In some aspects, the positioning target wireless device 702 may transmit a more specific request to the network entity 706 for a subset of the plurality of sets of environment information. The more specific request may include an indicator of the subset of sets of environment information, or an indicator of a subset of the plurality of areas that correspond with the subset of sets of environment information. In response, the network entity 706 may transmit the subset of sets of environment information to the positioning target wireless device 702 for the positioning target wireless device 702 to use at 716.

At 716, the positioning target wireless device 702 may simulate a set of positioning measurements based on the environment information 714. For example, the positioning target wireless device 702 may simulate a set of specular reflection effects on a set of positioning measurements based on the environment information 714. In another example, the positioning target wireless device 702 may simulate a set of non-specular reflection effects on a set of positioning measurements based on the environment information 714. In another example, the positioning target wireless device 702 may simulate a set of diffraction effects on a set of positioning measurements based on the environment information 714. In another example, the positioning target wireless device 702 may simulate a set of scattering effects on a set of positioning measurements based on the environment information 714. At 728, the positioning target wireless device 702 may calculate a positioning environment based on the simulated set of positioning measurements. At 730, the positioning target wireless device 702 may output the calculated positioning environment, for example by training a positioning model at the positioning target wireless device 702, or by transmitting the positioning environment to another device, for example one of the set of positioning neighbor wireless devices 704, the network entity 706, or an over-the-top (OTT) server configured to train a positioning model. At 732, the positioning target wireless device 702 may store the positioning environment on a memory of the positioning target wireless device 702, for example so that another wireless device may request the positioning environment from the positioning target wireless device 702 as environment information to simulate their own set of positioning measurements.

In some aspects, the positioning target wireless device 702 may combine the simulated positioning measurements with non-simulated positioning measurements measured by the positioning target wireless device 702. The network entity 706 may be a positioning network entity, such as an LMF or a location server. At 718, the network entity 706 may configure positioning for the positioning target wireless device positioning target and for the set of positioning neighbor wireless devices 704. The network entity 706 may transmit a set of configurations 720 to the positioning target wireless device 702. The network entity 706 may transmit a set of configurations 722 to the set of positioning neighbor wireless devices 704. The set of positioning neighbor wireless devices 704 may transmit the set of positioning signals 724 to the positioning target wireless device 702 based on the set of configurations 722. The positioning target wireless device 702 may receive the set of positioning signals 724 based on the set of configurations 720.

At 726, the positioning target wireless device 702 may measure the set of positioning signals 724. In some aspects, the positioning target wireless device 702 may also transmit positioning signals (e.g., SRSs) to the set of positioning neighbor wireless devices 704, which may measure the positioning signals transmitted by the positioning target wireless device 702. The set of positioning neighbor wireless devices 704 may transmit the measurements to the positioning target wireless device 702 for use at 728. In some aspects, the set of configurations 720 may include attributes of a set of light sources in an area associated with the positioning target wireless device 702, for example locations, orientation, and/or luminosity, which the positioning target wireless device 702 may use to measure positioning signals received by a sensor of the positioning target wireless device 702, for example a camera or a LIDAR sensor. The positioning target wireless device 702 may measure any suitable EM wave for conducting positioning, for example PRSs to perform RF positioning, reflected RF waves to perform RF sensing, or visual light to perform visual positioning.

At 728, the positioning target wireless device 702 may calculate a positioning environment based on the simulated positioning measurements simulated at 716, and based on the non-simulated positioning measurements measured at 726 (and/or received from other wireless devices, for example other UEs, other PRUs, or at least some of the set of positioning neighbor wireless devices 704). For example, the positioning target wireless device 702 may verify and perform error corrections on simulated positioning measurements based on the non-simulated positioning measurements. At 730, the positioning target wireless device 702 may output the calculated positioning environment, for example by training a positioning model at the positioning target wireless device 702, or by transmitting the positioning environment to another device, for example one of the set of positioning neighbor wireless devices 704, the network entity 706, or an OTT server configured to train a positioning model. At 732, the positioning target wireless device 702 may store the positioning environment on a memory of the positioning target wireless device 702, for example so that another wireless device may request the positioning environment from the positioning target wireless device 702 as environment information to simulate their own set of positioning measurements.

Figure 8:
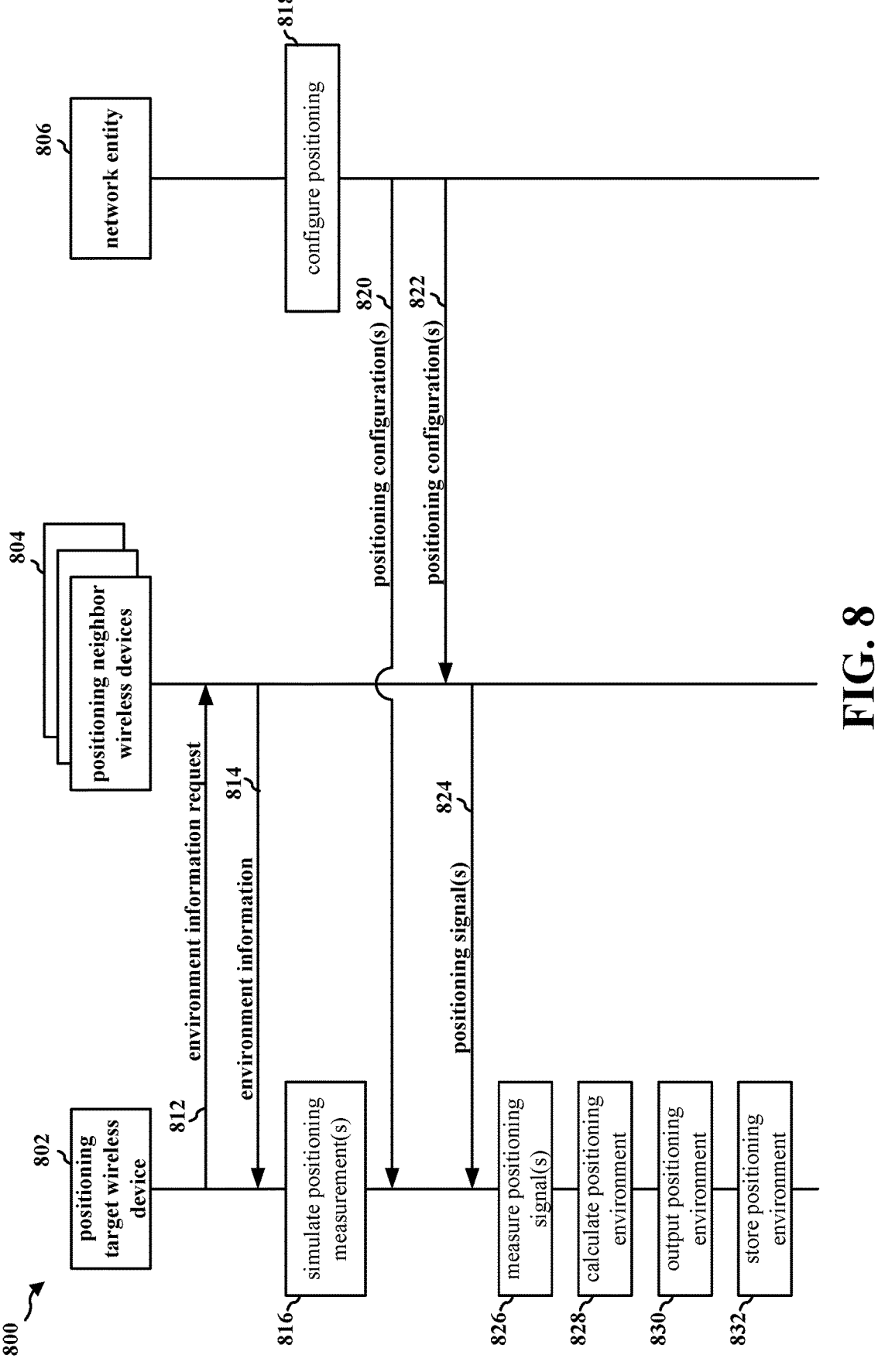
FIG. 8 is a connection flow diagram illustrating an example of signaling for calculating a positioning environment based on simulated positioning measurements.

FIG. 8 is a connection flow diagram 800 illustrating an example of signaling for calculating a positioning environment based on simulated positioning measurements. The connection flow diagram 800 may be an example of communications between a positioning target wireless device 802, a set of positioning neighbor wireless devices 804, and a network entity 806. The positioning target wireless device 802 may be a UE. The UE may be a PRU with a known location. The set of positioning neighbor wireless devices 804 may include a set of base stations and/or a set of TRPs configured to transmit positioning signals at the positioning target wireless device 802. The network entity 806 may include an LMF, may include one or more location servers, or may be a separate cloud server that may be configured to provide environment information. The set of positioning neighbor wireless devices 804 may be configured to provide environment information associated with an area.

The positioning target wireless device 802 may transmit a request 812 for environment information to at least one of the set of positioning neighbor wireless devices 804. At least one of the set of positioning neighbor wireless devices 804 may receive the request 812 for environment information from the positioning target wireless device 802. The positioning target wireless device 802 may transmit an LPP message, for example an LPP assistance data request message, that includes the request 812 for the environment information. The request 812 may include an indicator of a request for the availability of environment information (e.g., whether one of the set of positioning neighbor wireless devices 804 has a 3D model for an area that the positioning target wireless device 802 is located within, or will be placed). The request 812 may include an indicator of a set of model formats (e.g., CAD model formats) that the positioning target wireless device 802 is capable of handling. The request 812 may include an indicator of a model format (e.g., a specific CAD model format) that the positioning target wireless device 802 is capable of handling. The request 812 may include an indicator of a set of limits/ranges (e.g., latitudes, longitudes, elevations) for which the environment information is requested. The request 812 may include an indicator of an estimate of the location of the positioning target wireless device 802 (e.g., a coarse estimate, a fine estimate, a known location).

At least one of the set of positioning neighbor wireless devices 804 may transmit environment information 814 to the positioning target wireless device 802. The positioning target wireless device 802 may receive the environment information 814 from at least one of the set of positioning neighbor wireless devices 804. The at least one of the set of positioning neighbor wireless devices 804 may transmit the environment information 814 in response to the request 812. The at least one of the set of positioning neighbor wireless devices 804 may transmit the environment information 814 based on the request 812, for example by selecting a set of environment information, or a plurality of sets of environment information, to transmit to the positioning target wireless device 802 based on corresponding indicators in the request 812. The environment information 814 may include a 3D model of the requested area, for example as a CAD file or a CAD model. The environment information 814 may include an indicator that at least one of the set of positioning neighbor wireless devices 804 has available models for the positioning target wireless device 802. The environment information 814 may include an indicator of access rights that at least one of the set of positioning neighbor wireless devices 804 grants to the positioning target wireless device 802, or access rights that the positioning target wireless device 802 should have in order to access the environment information 814. The environment information 814 may include an indicator of a link to a file containing the requested information. The environment information 814 may include a description of what is within the file, for example limits/ranges of the information within the file, or available model formats that have the information. The environment information 814 may include an indicator of a 3D model, such as a unique identifier or an identifier of the type of file of the 3D model. The environment information 814 may include an indicator of how wireless devices with known locations (e.g., TRPs. APs, PRUs) map to the area associated with the model.

In some aspects, the environment information 814 may include indicators of a plurality of sets of environment information associated with a plurality of areas. In other words, the at least one of the set of positioning neighbor wireless devices 804 may be capable of transmitting a set of environment information corresponding with each of a plurality of areas. In some aspects, the positioning target wireless device 802 may transmit a more specific request to the at least one of the set of positioning neighbor wireless devices 804 for a subset of the plurality of sets of environment information in response to the indicators. The more specific request may include an indicator of the subset of sets of environment information, or an indicator of a subset of the plurality of areas that correspond with the subset of sets of environment information. In response, the at least one of the set of positioning neighbor wireless devices 804 may transmit the subset of sets of environment information to the positioning target wireless device 802 for the positioning target wireless device 802 to use at 816.

At 816, the positioning target wireless device 802 may simulate a set of positioning measurements based on the environment information 814. For example, the positioning target wireless device 802 may simulate a set of specular reflection effects on a set of positioning measurements based on the environment information 814. In another example, the positioning target wireless device 802 may simulate a set of non-specular reflection effects on a set of positioning measurements based on the environment information 814. In another example, the positioning target wireless device 802 may simulate a set of diffraction effects on a set of positioning measurements based on the environment information 814. In another example, the positioning target wireless device 802 may simulate a set of scattering effects on a set of positioning measurements based on the environment information 814. At 828, the positioning target wireless device 802 may calculate a positioning environment based on the simulated set of positioning measurements. At 830, the positioning target wireless device 802 may output the calculated positioning environment, for example by training a positioning model at positioning target wireless device 802, or by transmitting the positioning environment to another device, for example one of the set of positioning neighbor wireless devices 804, the network entity 806, or an OTT server configured to train a positioning model. At 832, the positioning target wireless device 802 may store the positioning environment on a memory of the positioning target wireless device 802, for example so that another wireless device may request the positioning environment from the positioning target wireless device 802 as environment information to simulate their own set of positioning measurements.

In some aspects, the positioning target wireless device 802 may combine the simulated positioning measurements with non-simulated positioning measurements measured by the positioning target wireless device 802. The network entity 806 may be a positioning network entity, such as an LMF or a location server. At 818, the network entity 806 may configure positioning for the positioning target wireless device 802 and for the set of positioning neighbor wireless devices 804. The network entity 806 may transmit a set of configurations 820 to the positioning target wireless device 802. The network entity 806 may transmit a set of configurations 822 to the set of positioning neighbor wireless devices 804. The set of positioning neighbor wireless devices 804 may transmit the set of positioning signals 824 to the positioning target wireless device 802 based on the set of configurations 822. The positioning target wireless device 802 may receive the set of positioning signals 824 based on the set of configurations 820.

At 826, the positioning target wireless device 802 may measure the set of positioning signals 824. In some aspects, the positioning target wireless device 802 may also transmit positioning signals (e.g., SRSs) to the set of positioning neighbor wireless devices 804, which may measure the positioning signals transmitted by the positioning target wireless device 802. The set of positioning neighbor wireless devices 804 may transmit the measurements to the positioning target wireless device 802 for use at 828. In some aspects, the set of configurations 820 may include attributes of a set of light sources in an area associated with the positioning target wireless device 802, for example locations, orientation, and/or luminosity, which the positioning target wireless device 802 may use to measure positioning signals received by a sensor of the positioning target wireless device 802, for example a camera or a LIDAR sensor. The positioning target wireless device 802 may measure any suitable EM wave for conducting positioning, for example PRSs to perform RF positioning, reflected RF waves to perform RF sensing, or visual light to perform visual positioning.

At 828, the positioning target wireless device 802 may calculate a positioning environment based on the simulated positioning measurements simulated at 816, and/or based on the non-simulated positioning measurements measured at 826 (and/or received from other wireless devices, for example other UEs, other PRUs, or at least some of the set of positioning neighbor wireless devices 804). For example, the positioning target wireless device 802 may verify and perform error corrections on simulated positioning measurements based on the non-simulated positioning measurements. At 830, the positioning target wireless device 802 may output the calculated positioning environment, for example by training a positioning model at the positioning target wireless device 802, or by transmitting the positioning environment to another device, for example one of the set of positioning neighbor wireless devices 804, the network entity 806, or an OTT server configured to train a positioning model. At 832, the positioning target wireless device 802 may store the positioning environment on a memory of the positioning target wireless device 802, for example so that another wireless device may request the positioning environment from the positioning target wireless device 802 as environment information to simulate their own set of positioning measurements.

Figure 9:
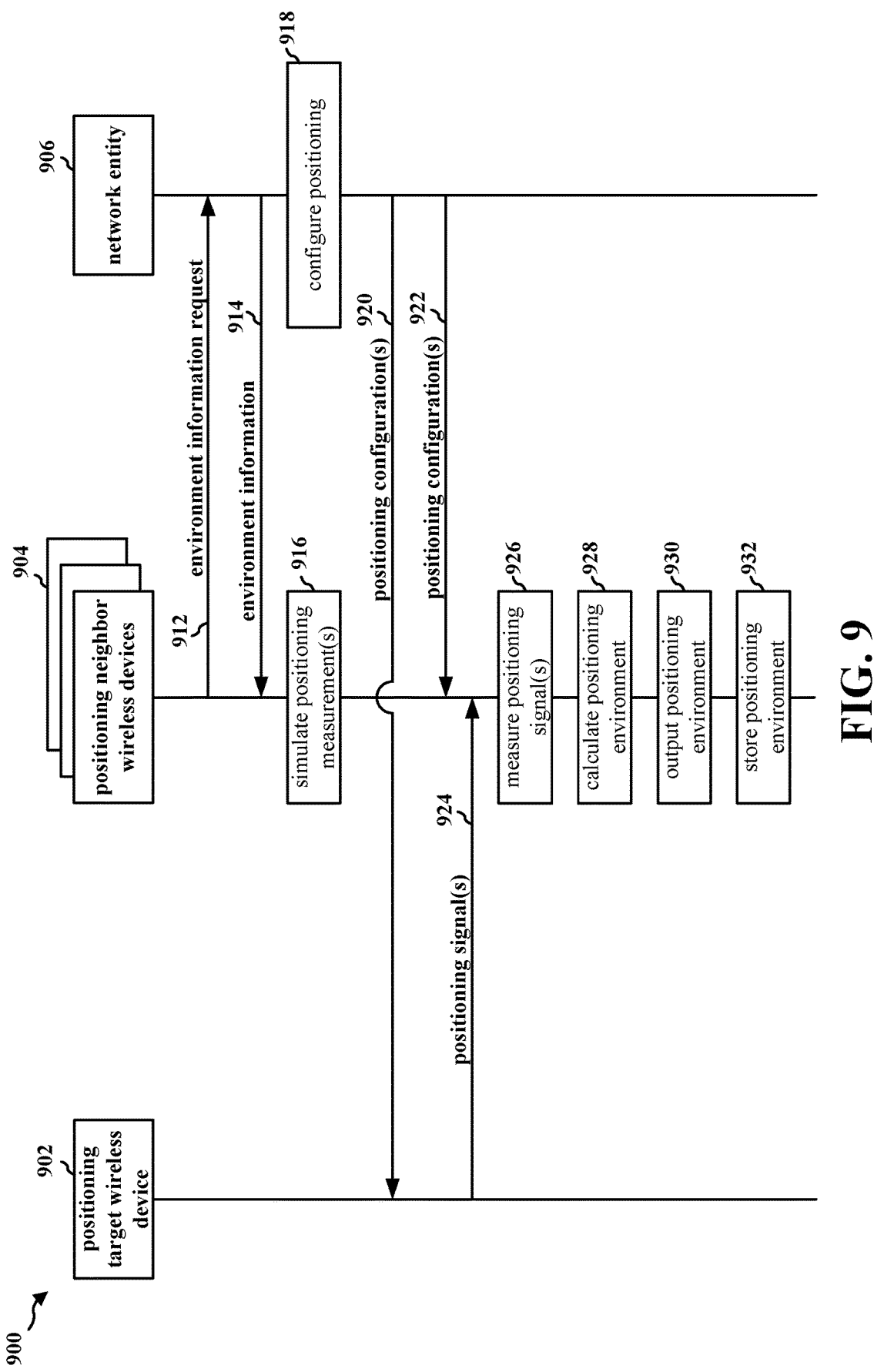
FIG. 9 is a connection flow diagram illustrating an example of signaling for calculating a positioning environment based on simulated positioning measurements.

FIG. 9 is a connection flow diagram 900 illustrating an example of signaling for calculating a positioning environment based on simulated positioning measurements. The connection flow diagram 900 may be an example of communications between a positioning target wireless device 902, a set of positioning neighbor wireless devices 904, and a network entity 906. The positioning target wireless device 902 may be a UE. The UE may be a PRU with a known location. The set of positioning neighbor wireless devices 904 may include a set of base stations and/or a set of TRPs configured to transmit positioning signals at the positioning target wireless device 902. The network entity 906 may include an LMF, may include one or more location servers, or may be a separate cloud server that may be configured to provide environment information. The network entity 906 may be configured to provide environment information associated with an area.

One of the set of positioning neighbor wireless devices 904 may transmit a request 912 for environment information to the network entity 906. The network entity 906 may receive the request 912 for environment information from at least one of the set of positioning neighbor wireless devices 904. At least one of the set of positioning neighbor wireless devices 904 may transmit a new radio positioning protocol (NRPP) message, for example an NRPP assistance data request message, that includes the request 912 for the environment information. The request 912 may include an indicator of a request for the availability of environment information (e.g., whether the network entity 906 has a 3D model for an area that the positioning target wireless device 902 is located within, or will be placed). The request 912 may include an indicator of a set of model formats (e.g., CAD model formats) that the at least one of the set of positioning neighbor wireless devices 904 is capable of handling. The request 912 may include an indicator of a model format (e.g., a specific CAD model format) that the positioning target wireless device 902 is capable of handling. The request 912 may include an indicator of a set of limits/ranges (e.g., latitudes, longitudes, elevations) for which the environment information is requested. The request 912 may include an indicator of an estimate of the location of the positioning target wireless device 902 (e.g., a coarse estimate, a fine estimate, a known location) or a location of at least one of the set of positioning neighbor wireless devices 904.

The network entity 906 may transmit environment information 914 to at least one of the set of positioning neighbor wireless devices 904. The at least one of the set of positioning neighbor wireless devices 904 may receive the environment information 914 from the network entity 906. The network entity 906 may transmit the environment information 914 in response to the request 912. The network entity 906 may transmit the environment information 914 based on the request 912, for example by selecting a set of environment information, or a plurality of sets of environment information, to transmit to the at least one of the set of positioning neighbor wireless devices 904 based on corresponding indicators in the request 912. The environment information 914 may include a 3D model of the requested area, for example as a CAD file or a CAD model. The environment information 914 may include an indicator that the network entity 906 has available models for the at least one of the set of positioning neighbor wireless devices 904. The environment information 914 may include an indicator of access rights that the network entity 906 grants to the at least one of the set of positioning neighbor wireless devices 904, or access rights that the at least one of the set of positioning neighbor wireless devices 904 should have in order to access the environment information 914. The environment information 914 may include an indicator of a link to a file containing the requested information. The environment information 914 may include a description of what is within the file, for example limits/ranges of the information within the file, or available model formats that have the information. The environment information 914 may include an indicator of a 3D model, such as a unique identifier or an identifier of the type of file of the 3D model. The environment information 914 may include an indicator of how wireless devices with known locations (e.g., TRPs, APs. PRUS) map to the area associated with the model.

In some aspects, the environment information 914 may include indicators of a plurality of sets of environment information associated with a plurality of areas. In other words, the network entity 906 may be capable of transmitting a set of environment information for each of a plurality of areas. In some aspects, the at least one of the set of positioning neighbor wireless devices 904 may transmit a more specific request to the network entity 906 for a subset of the plurality of sets of environment information. The more specific request may include an indicator of the subset of sets of environment information, or an indicator of a subset of the plurality of areas that correspond with the subset of sets of environment information. In response, the network entity 906 may transmit the subset of sets of environment information to the at least one of the set of positioning neighbor wireless devices 904 for the device to use at 916.

At 916, the at least one of the set of positioning neighbor wireless devices 904 may simulate a set of positioning measurements based on the environment information 914. For example, the at least one of the set of positioning neighbor wireless devices 904 may simulate a set of specular reflection effects on a set of positioning measurements based on the environment information 914. In another example, the at least one of the set of positioning neighbor wireless devices 904 may simulate a set of non-specular reflection effects on a set of positioning measurements based on the environment information 914. In another example, the at least one of the set of positioning neighbor wireless devices 904 may simulate a set of diffraction effects on a set of positioning measurements based on the environment information 914. In another example, the at least one of the set of positioning neighbor wireless devices 904 may simulate a set of scattering effects on a set of positioning measurements based on the environment information 914. At 928, the at least one of the set of positioning neighbor wireless devices 904 may calculate a positioning environment based on the simulated set of positioning measurements. At 930, the at least one of the set of positioning neighbor wireless devices 904 may output the calculated positioning environment, for example by training a positioning model at the at least one of the set of positioning neighbor wireless devices 904, or by transmitting the positioning environment to another device, for example the positioning target wireless device 902, the network entity 906, or an OTT server configured to train a positioning model. At 932, the at least one of the set of positioning neighbor wireless devices 904 may store the positioning environment on a memory of the at least one of the set of positioning neighbor wireless devices 904, for example so that another wireless device may request the positioning environment from the at least one of the set of positioning neighbor wireless devices 904 as environment information to simulate their own set of positioning measurements.

In some aspects, the at least one of the set of positioning neighbor wireless devices 904 may combine the simulated positioning measurements with non-simulated positioning measurements measured by the at least one of the set of positioning neighbor wireless devices 904. The network entity 906 may be a positioning network entity, such as an LMF or a location server. At 918, the network entity 906 may configure positioning for the positioning target wireless device 902 and for the set of positioning neighbor wireless devices 904. The network entity 906 may transmit a set of configurations 920 to the positioning target wireless device 902. The network entity 906 may transmit a set of configurations 922 to the set of positioning neighbor wireless devices 904. The positioning target wireless device 902 may transmit the set of positioning signals 924 to the set of positioning neighbor wireless devices 904 based on the set of configurations 920. The set of positioning neighbor wireless devices 904 may receive the set of positioning signals 924 based on the set of configurations 922.

At 926, the set of positioning neighbor wireless devices 904 may measure the set of positioning signals 924. In some aspects, the set of positioning neighbor wireless devices 904 may also transmit positioning signals (e.g., PRSs) to the positioning target wireless device 902 (and possibly other wireless devices, for example UEs and PRUs), which may measure the positioning signals transmitted by the set of positioning neighbor wireless devices 904. The positioning target wireless device 902 (and/or other wireless devices receiving the positioning signals, and/or others of the set of positioning neighbor wireless devices 904) may transmit the measurements to at least one of the set of positioning neighbor wireless devices 904 for use at 928. In some aspects, at least one of the set of positioning neighbor wireless devices 904 may aggregate measurements from the others of the set of positioning neighbor wireless devices 904. For the example, the others of the set of positioning neighbor wireless devices 904 may transmit measurements to the at least one of the set of positioning neighbor wireless devices 904. In some aspects, the set of configurations 922 may include attributes of a set of light sources in an area associated with at least one of the set of positioning neighbor wireless devices 904, for example locations, orientation, and/or luminosity, which at least one of the set of positioning neighbor wireless devices 904 may use to measure positioning signals received by a sensor of the at least one of the set of positioning neighbor wireless devices 904, for example a camera or a LIDAR sensor. The at least one of the set of positioning neighbor wireless devices 904 may measure any suitable EM wave for conducting positioning, for example PRSs to perform RF positioning, reflected RF waves to perform RF sensing, or visual light to perform visual positioning.

At 928, the set of positioning neighbor wireless devices 904 may calculate a positioning environment based on the simulated positioning measurements simulated at 916, and based on the non-simulated positioning measurements measured at 926 (and/or received from other wireless devices, for example the positioning target wireless device 902, or at least some of the others of the set of positioning neighbor wireless devices 904). For example, the at least one of the set of positioning neighbor wireless devices 904 may verify and perform error corrections on simulated positioning measurements based on the non-simulated positioning measurements. At 930, the at least one of the set of positioning neighbor wireless devices 904 may output the calculated positioning environment, for example by training a positioning model at the at least one of the set of positioning neighbor wireless devices 904, or by transmitting the positioning environment to another device, for example the positioning target wireless device 902, the network entity 906, or an OTT server configured to train a positioning model. At 932, the at least one of the set of positioning neighbor wireless devices 904 may store the positioning environment on a memory of the at least one of the set of positioning neighbor wireless devices 904, for example so that another wireless device may request the positioning environment as environment information from the at least one of the set of positioning neighbor wireless devices 904 to simulate their own set of positioning measurements.

Figure 10:
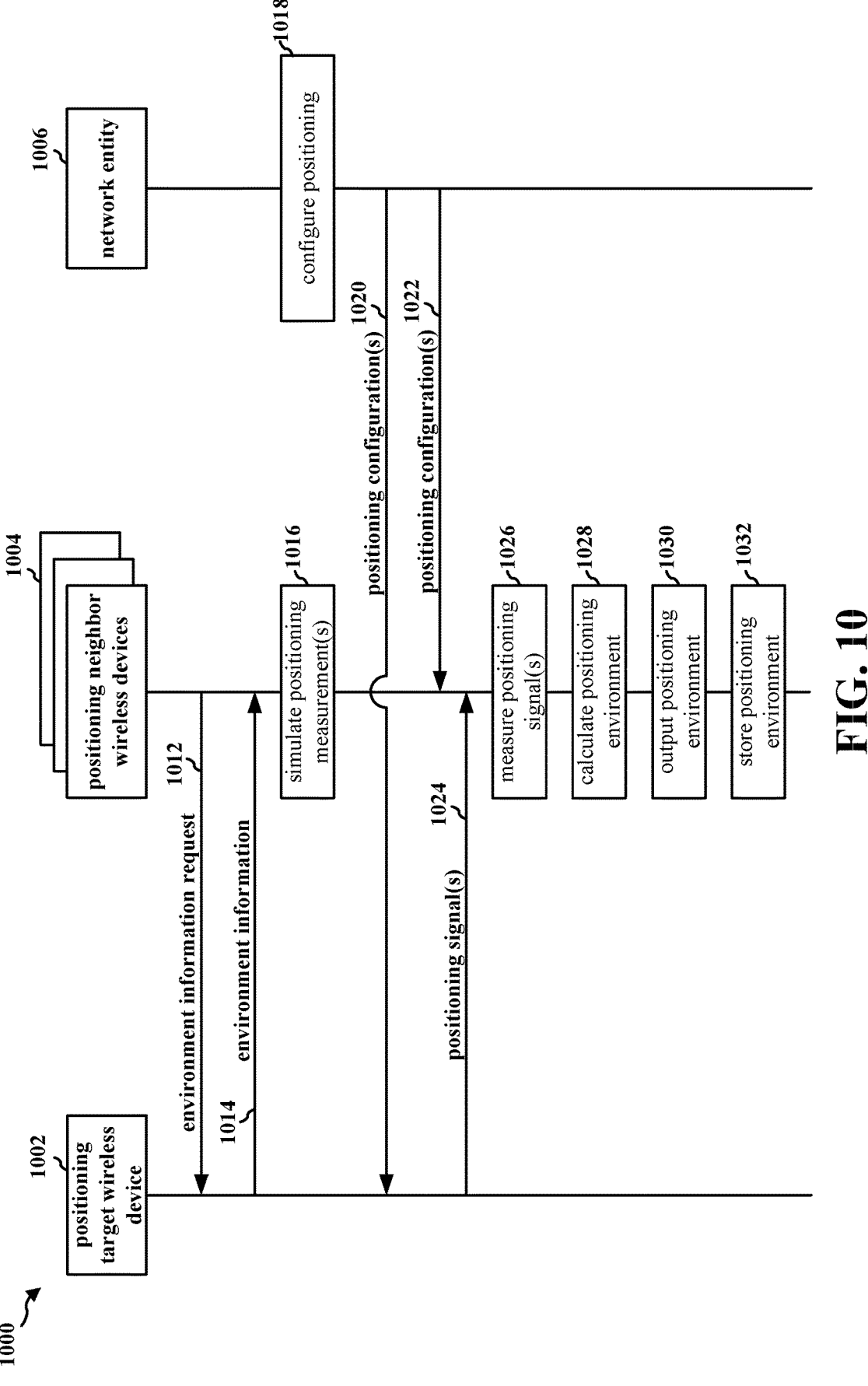
FIG. 10 is a connection flow diagram illustrating an example of signaling for calculating a positioning environment based on simulated positioning measurements.

FIG. 10 is a connection flow diagram 1000 illustrating an example of signaling for calculating a positioning environment based on simulated positioning measurements. The connection flow diagram 1000 may be an example of communications between a positioning target wireless device 1002 (e.g., a wireless device), a set of positioning neighbor wireless devices 1004, and a network entity 1006. The positioning target wireless device 1002 may be a UE. The UE may be a PRU with a known location. The set of positioning neighbor wireless devices 1004 may include a set of base stations and/or a set of TRPs configured to transmit positioning signals at the positioning target wireless device 1002. The network entity 1006 may include an LMF, may include one or more location servers, or may be a separate cloud server that may be configured to provide environment information. The set of positioning neighbor wireless devices 1004 may be configured to provide environment information associated with an area.

One of the set of positioning neighbor wireless devices 1004 may transmit a request 1012 for environment information to the positioning target wireless device 1002. The positioning target wireless device 1002 may receive the request 1012 for environment information from at least one of the set of positioning neighbor wireless devices 1004. At least one of the set of positioning neighbor wireless devices 1004 may transmit an LPP message, for example an LPP assistance data request message, that includes the request

1012 for the environment information. The request 1012 may include an indicator of a request for the availability of environment information (e.g., whether the positioning target wireless device 1002 has a 3D model for an area that the positioning target wireless device 1002 is located within, or will be placed). The request 1012 may include an indicator of a set of model formats (e.g., CAD model formats) that the at least one of the set of positioning neighbor wireless devices 1004 is capable of handling. The request 1012 may include an indicator of a model format (e.g., a specific CAD model format) that the positioning target wireless device 1002 is capable of handling. The request 1012 may include an indicator of a set of limits/ranges (e.g., latitudes, longitudes, elevations) for which the environment information is requested. The request 1012 may include an indicator of an estimate of the location of the positioning target wireless device 1002 (e.g., a coarse estimate, a fine estimate, a known location) or a location of at least one of the set of positioning neighbor wireless devices 1004.

The positioning target wireless device 1002 may transmit environment information 1014 to at least one of the set of positioning neighbor wireless devices 1004. The at least one of the set of positioning neighbor wireless devices 1004 may receive the environment information 1014 from the positioning target wireless device 1002. The positioning target wireless device 1002 may transmit the environment information 1014 in response to the request 1012. The positioning target wireless device 1002 may transmit the environment information 1014 based on the request 1012, for example by selecting a set of environment information, or a plurality of sets of environment information, to transmit to the at least one of the set of positioning neighbor wireless devices 1004 based on corresponding indicators in the request 1012. The environment information 1014 may include a 3D model of the requested area, for example as a CAD file or a CAD model. The environment information 1014 may include an indicator that the positioning target wireless device 1002 has available models for the at least one of the set of positioning neighbor wireless devices 1004. The environment information 1014 may include an indicator of access rights that the positioning target wireless device 1002 grants to the at least one of the set of positioning neighbor wireless devices 1004, or access rights that the at least one of the set of positioning neighbor wireless devices 1004 should have in order to access the environment information 1014. The environment information 1014 may include an indicator of a link to a file containing the requested information. The environment information 1014 may include a description of what is within the file, for example limits/ranges of the information within the file, or available model formats that have the information. The environment information 1014 may include an indicator of a 3D model, such as a unique identifier or an identifier of the type of file of the 3D model. The environment information 1014 may include an indicator of how wireless devices with known locations (e.g., TRPs, APs. PRUS) map to the area associated with the model.

In some aspects, the environment information 1014 may include indicators of a plurality of sets of environment information associated with a plurality of areas. In other words, the positioning target wireless device 1002 may be capable of transmitting a set of environment information for each of a plurality of areas. In some aspects, the at least one of the set of positioning neighbor wireless devices 1004 may transmit a more specific request to the positioning target wireless device 1002 for a subset of the plurality of sets of environment information. The more specific request may include an indicator of the subset of sets of environment information, or an indicator of a subset of the plurality of areas that correspond with the subset of sets of environment information. In response, the positioning target wireless device 1002 may transmit the subset of sets of environment information to the at least one of the set of positioning neighbor wireless devices 1004 for the device to use at 1016.

At 1016, the at least one of the set of positioning neighbor wireless devices 1004 may simulate a set of positioning measurements based on the environment information 1014. For example, the at least one of the set of positioning neighbor wireless devices 1004 may simulate a set of specular reflection effects on a set of positioning measurements based on the environment information 1014. In another example, the at least one of the set of positioning neighbor wireless devices 1004 may simulate a set of non-specular reflection effects on a set of positioning measurements based on the environment information 1014. In another example, the at least one of the set of positioning neighbor wireless devices 1004 may simulate a set of diffraction effects on a set of positioning measurements based on the environment information 1014. In another example, the at least one of the set of positioning neighbor wireless devices 1004 may simulate a set of scattering effects on a set of positioning measurements based on the environment information 1014. At 1028, the at least one of the set of positioning neighbor wireless devices 1004 may calculate a positioning environment based on the simulated set of positioning measurements. At 1030, the at least one of the set of positioning neighbor wireless devices 1004 may output the calculated positioning environment, for example by training a positioning model at the at least one of the set of positioning neighbor wireless devices 1004, or by transmitting the positioning environment to another device, for example the network entity 1006, the positioning target wireless device 1002, or an OTT server configured to train a positioning model. At 1032, the at least one of the set of positioning neighbor wireless devices 1004 may store the positioning environment on a memory of the at least one of the set of positioning neighbor wireless devices 1004, for example so that another wireless device may request the positioning environment from the at least one of the set of positioning neighbor wireless devices 1004 as environment information to simulate their own set of positioning measurements.

In some aspects, the at least one of the set of positioning neighbor wireless devices 1004 may combine the simulated positioning measurements with non-simulated positioning measurements measured by the at least one of the set of positioning neighbor wireless devices 1004. The positioning target wireless device 1002 may be a positioning network entity, such as an LMF or a location server. At 1018, the network entity 1006 may configure positioning for the positioning target wireless device 1002 and/or for the set of positioning neighbor wireless devices 1004. The network entity 1006 may transmit a set of configurations 1020 to the positioning target wireless device 1002. The network entity 1006 may transmit a set of configurations 1022 to the set of positioning neighbor wireless devices 1004. The positioning target wireless device 1002 may transmit the set of positioning signals 1024 to the set of positioning neighbor wireless devices 1004 based on the set of configurations 1020. The set of positioning neighbor wireless devices 1004 may receive the set of positioning signals 1024 based on the set of configurations 1022.

At 1026, the set of positioning neighbor wireless devices 1004 may measure the set of positioning signals 1024. In some aspects, the set of positioning neighbor wireless devices 1004 may also transmit positioning signals (e.g., PRSs) to the positioning target wireless device 1002 (and possibly other wireless devices, for example UEs and PRUs), which may measure the positioning signals transmitted by the set of positioning neighbor wireless devices 1004. The positioning target wireless device 1002 (and/or other wireless devices receiving the positioning signals, and/or others of the set of positioning neighbor wireless devices 1004) may transmit the measurements to at least one of the set of positioning neighbor wireless devices 1004 for use at 1028. In some aspects, at least one of the set of positioning neighbor wireless devices 1004 may aggregate measurements from the others of the set of positioning neighbor wireless devices 1004. For the example, the others of the set of positioning neighbor wireless devices 1004 may transmit measurements to the at least one of the set of positioning neighbor wireless devices 1004. In some aspects, the set of configurations 1022 may include attributes of a set of light sources in an area associated with at least one of the set of positioning neighbor wireless devices 1004, for example locations, orientation, and/or luminosity, which at least one of the set of positioning neighbor wireless devices 1004 may use to measure positioning signals received by a sensor of the at least one of the set of positioning neighbor wireless devices 1004, for example a camera or a LIDAR sensor. The at least one of the set of positioning neighbor wireless devices 1004 may measure any suitable EM wave for conducting positioning, for example PRSs to perform RF positioning, reflected RF waves to perform RF sensing, or visual light to perform visual positioning.

At 1028, the set of positioning neighbor wireless devices 1004 may calculate a positioning environment based on the simulated positioning measurements simulated at 1016, and based on the non-simulated positioning measurements measured at 1026. For example, the at least one of the set of positioning neighbor wireless devices 1004 may verify and perform error corrections on simulated positioning measurements based on the non-simulated positioning measurements (and/or received from other wireless devices, for example the positioning target wireless device 1002, or at least some of the others of the set of positioning neighbor wireless devices 1004). At 1030, the at least one of the set of positioning neighbor wireless devices 1004 may output the calculated positioning environment, for example by training a positioning model at the at least one of the set of positioning neighbor wireless devices 1004, or by transmitting the positioning environment to another device, for example the network entity 1006, the positioning target wireless device 1002, or an OTT server configured to train a positioning model. At 1032, the at least one of the set of positioning neighbor wireless devices 1004 may store the positioning environment on a memory of the at least one of the set of positioning neighbor wireless devices 1004, for example so that another wireless device may request the positioning environment as environment information from the at least one of the set of positioning neighbor wireless devices 1004 to simulate their own set of positioning measurements.

Figure 11:
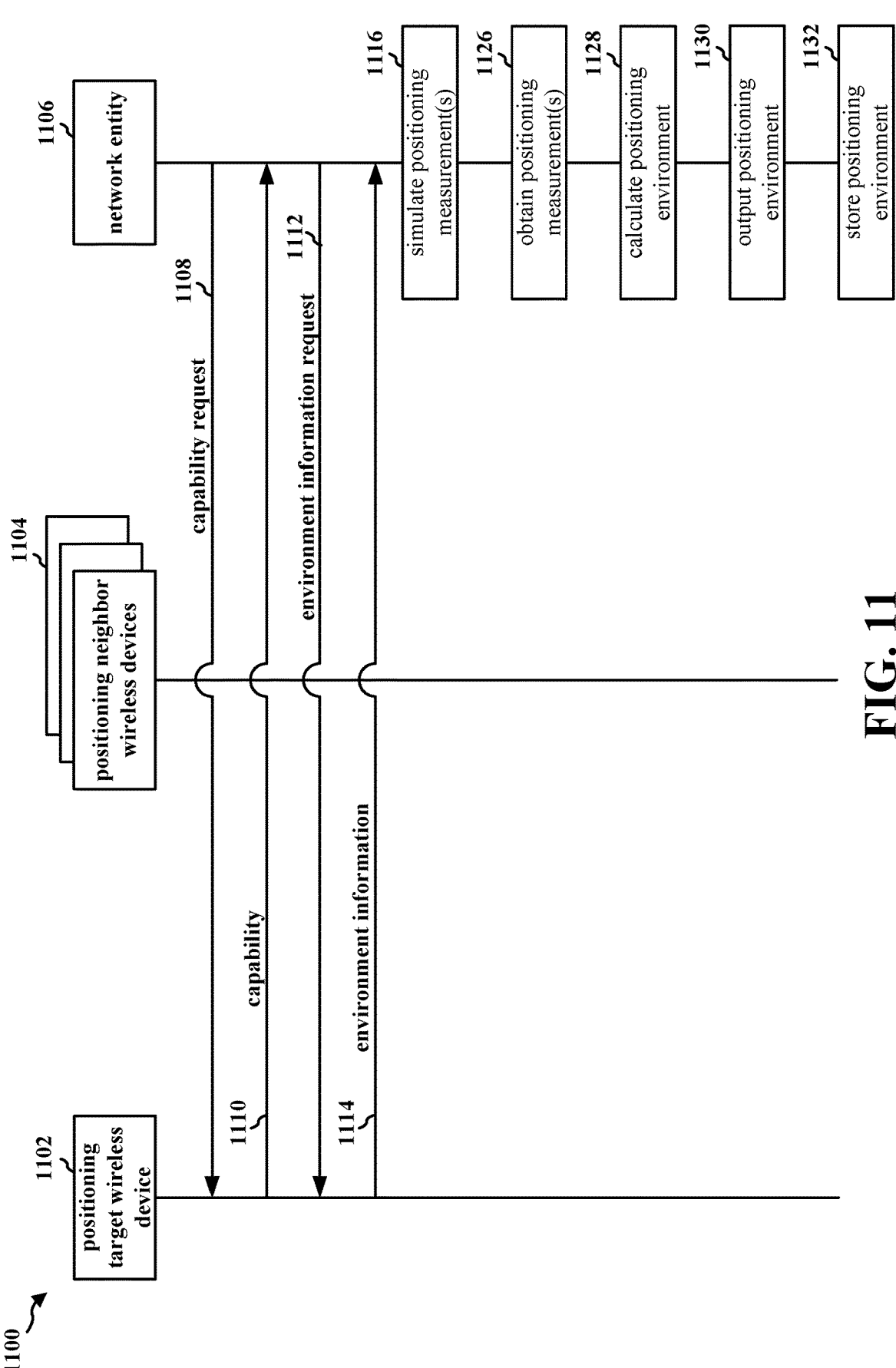
FIG. 11 is a connection flow diagram illustrating an example of signaling for calculating a positioning environment based on simulated positioning measurements.

FIG. 11 is a connection flow diagram 1100 illustrating an example of signaling for calculating a positioning environment based on simulated positioning measurements. The connection flow diagram 1100 may be an example of communications between a positioning target wireless device 1102, a set of positioning neighbor wireless devices 1104, and a network entity 1106. The positioning target wireless device 1102 may be a UE. The UE may be a PRU with a known location. The set of positioning neighbor wireless devices 1104 may include a set of base stations and/or a set of TRPs. The positioning target wireless device 1102 and the set of positioning neighbor positioning neighbor wireless devices 1104 may be configured to transmit and measure positioning signals with one another. The network entity 1106 may include an LMF, may include one or more location servers, or may be a separate cloud server that may be configured to provide environment information. The positioning target wireless device 1102 may be configured to share environment information with other wireless devices.

The network entity 1106 may transmit a capability request 1108 to the positioning target wireless device 1102. The capability request 1108 may include an indicator for the positioning target wireless device 1102 to provide its capability to provide environment information to the network entity 1106. The capability request 1108 may include an indicator of the area which the network entity 1106 is requesting data on. The capability request 1108 may include an indicator of limits/ranges (e.g., latitudes, longitudes, elevations) that provide conditions associated with the requested environmental information. The network entity 1106 may transmit an LPP message, for example an LPP capability request message, to the positioning target wireless device 1102. The positioning target wireless device 1102 may transmit a capability 1110 to the network entity 1106. The capability 1110 may include environmental information associated with the area that the positioning target wireless device 1102 is in. The positioning target wireless device 1102 may have collected at least some of the environmental information (e.g., via measurements of positioning signals), may have calculated at least some of the environmental information (e.g., based on measurements of positioning signals), or may have received at least some of the environmental information from other wireless devices (e.g., from an OTT server, from other wireless devices about the positioning target wireless device 1102). The positioning target wireless device 1102 may select the capability information to provide based on the request, for example providing attributes of environment information associated with a requested area, or providing attributes of environment information that adhere to the conditions of limits/ranges (e.g., latitudes, longitudes, elevations) that were requested. The capability 1110 may include an indicator of what kinds of environment information are available (e.g., types of CAD files, attributes of CAD files). The capability 1110 may include an indicator of access rights that may be associated with the environment information (the network entity 1106 may authenticate with these access rights before gaining access to the environment information). The capability 1110 may include a description of attributes of the environment information (e.g., limits/ranges of CAD files, available file formats). The capability 1110 may include a set of indicators that identify 3D models for various areas. The positioning target wireless device 1102 may transmit an LPP message, for example an LPP capability exchange request message, that includes the capability 1110 to the network entity 1106.

The network entity 1106 may transmit a request 1112 for the environment information from the positioning target wireless device 1102. The network entity 1106 may base the request 1112 on the capability 1110, for example by requesting 3D models identified by the capability 1110. The positioning target wireless device 1102 may transmit the environment information 1114 to the network entity 1106. The environment information 1114 may include information collected by the positioning target wireless device 1102 with the set of positioning neighbor wireless devices 1104, for example measurements of positioning signals transmitted by the set of positioning neighbor wireless devices 1104, measurements of positioning signals measured by at least some of the set of positioning neighbor wireless devices 1104, calculations of attributes of an environment about the positioning target wireless device 1102 based on the measurements, and/or environment information obtained by the positioning target wireless device 1102 from other devices. The environment information 1114 may include a 3D model of the requested area, for example as a CAD file or a CAD model. The environment information 1114 may include an indicator that the positioning target wireless device 1102 has available models for the network entity 1106. The environment information 1114 may include an indicator of access rights that the positioning target wireless device 1102 grants to the network entity 1106, or access rights that the network entity 1106 should have in order to access the environment information 1114. The environment information 1114 may include an indicator of a link to a file containing the requested information. The environment information 1114 may include a description of what is within the file, for example limits/ranges of the information within the file, or available model formats that have the information. The environment information 1114 may include an indicator of a 3D model, such as a unique identifier or an identifier of the type of file of the 3D model. The environment information 1114 may include an indicator of how wireless devices with known locations (e.g., TRPs, APs, PRUs) map to the area associated with the model.

In some aspects, the environment information 1114 may include indicators of a plurality of sets of environment information associated with a plurality of areas. In other words, the positioning target wireless device 1102 may be capable of transmitting a set of environment information for each of a plurality of areas. In some aspects, the network entity 1106 may transmit a more specific request to the positioning target wireless device 1102 for a subset of the plurality of sets of environment information. The more specific request may include an indicator of the subset of sets of environment information, or an indicator of a subset of the plurality of areas that correspond with the subset of sets of environment information. In response, the positioning target wireless device 1102 may transmit the subset of sets of environment information to the network entity 1106 for the network entity 1106 to use at 1116.

At 1116, the network entity 1106 may simulate positioning measurements based on the environment information 1114. For example, the network entity 1106 may simulate a set of specular reflection effects on a set of positioning measurements based on the environment information 1114. In another example, the network entity 1106 may simulate a set of non-specular reflection effects on a set of positioning measurements based on the environment information 1114. In another example, the network entity 1106 may simulate a set of diffraction effects on a set of positioning measurements based on the environment information 1114. In another example, the network entity 1106 may simulate a set of scattering effects on a set of positioning measurements based on the environment information 1114.

At 1128, the network entity 1106 may calculate a positioning environment based on the simulations at 1116. At 1130, the network entity 1106 may output the calculated positioning environment, for example by training a positioning model at the network entity 1106, or by transmitting the positioning environment to another device, for example one of the set of positioning neighbor wireless devices 1104, the positioning target wireless device 1102, or an OTT server configured to train a positioning model. At 1132, the network entity 1106 may store the positioning environment on a memory of the network entity 1106, for example so that another wireless device may request the positioning environment from the network entity 1106 as environment information to simulate their own set of positioning measurements.

At 1126, the network entity 1106 may obtain positioning measurements from devices, for example, the positioning target wireless device 1102, the set of positioning neighbor wireless devices 1104, other UEs, other PRUs, and/or other base stations. The network entity 1106 may receive the positioning measurements as positioning reports. In some aspects, the network entity 1106 may combine the simulated positioning measurements with non-simulated positioning measurements obtained by the network entity 1106 at 1226. The network entity 1106 may be a positioning network entity, such as an LMF or a location server. At 1128, the network entity 1106 may calculate a positioning environment based on the simulated positioning measurements simulated at 1116, and based on the non-simulated positioning measurements obtained at 1126. For example, the network entity 1106 may verify and perform error corrections on simulated positioning measurements based on the non-simulated positioning measurements. At 1130, the network entity 1106 may output the calculated positioning environment, for example by training a positioning model at the network entity 1106, or by transmitting the positioning environment to another device, for example one of the set of positioning neighbor wireless devices 1104, positioning target wireless device 1202, or an OTT server configured to train a positioning model. At 1132, the network entity 1106 may store the positioning environment on a memory of the network entity 1106, for example so that another wireless device may request the positioning environment from the network entity 1106 as environment information to simulate their own set of positioning measurements.

FIG. 12 is a connection flow diagram 1200 illustrating an example of signaling for calculating a positioning environment based on simulated positioning measurements. The connection flow diagram 1200 may be an example of communications between at least one of the positioning neighbor wireless devices 1204 and a network entity 1206. The positioning target wireless device 1202 may be a UE. The UE may be a PRU with a known location. The set of positioning neighbor wireless devices 1204 may include a set of base stations and/or a set of TRPs. The wireless device 1202 and the set of positioning neighbor positioning neighbor wireless devices 1204 may be configured to transmit and measure positioning signals with one another. The network entity 1206 may include an LMF, may include one or more location servers, or may be a separate cloud server that may be configured to provide environment information. The at least one of the positioning neighbor wireless devices 1204 may be configured to share environment information with other wireless devices.

The network entity 1206 may transmit a capability request 1208 to at least one of the positioning neighbor wireless devices 1204. The capability request 1208 may include an indicator for the at least one of the positioning neighbor wireless devices 1204 to provide its capability to provide environment information to the network entity 1206. The capability request 1208 may include an indicator of the area which the network entity 1206 is requesting data on. The capability request 1208 may include an indicator of limits/ranges (e.g., latitudes, longitudes, elevations) that provide conditions associated with the requested environmental information. The network entity 1206 may transmit an NRPP message, for example an NRPP capability request message, to the at least one of the positioning neighbor wireless devices 1204. The at least one of the positioning neighbor wireless devices 1204 may transmit a capability 1210 to the network entity 1206. The capability 1210 may include environmental information associated with the area that the at least one of the positioning neighbor wireless devices 1204 is in. The at least one of the positioning neighbor wireless devices 1204 may have collected at least some of the environmental information (e.g., via measurements of positioning signals), may have calculated at least some of the environmental information (e.g., based on measurements of positioning signals), or may have received at least some of the environmental information from other wireless devices (e.g., from an OTT server, from other wireless devices about the at least one of the positioning neighbor wireless devices 1204). The at least one of the positioning neighbor wireless devices 1204 may select the capability information to provide based on the request, for example providing attributes of environment information associated with a requested area, or providing attributes of environment information that adhere to the conditions of limits/ranges (e.g., latitudes, longitudes, elevations) that were requested. The capability 1210 may include an indicator of what kinds of environment information are available (e.g., types of CAD files, attributes of CAD files). The capability 1210 may include an indicator of access rights that may be associated with the environment information (the network entity 1206 may authenticate with these access rights before gaining access to the environment information). The capability 1210 may include a description of attributes of the environment information (e.g., limits/ranges of CAD files, available file formats). The capability 1210 may include a set of indicators that identify 3D models for various areas. The at least one of the positioning neighbor wireless devices 1204 may transmit an NRPP message, for example an NRPP capability exchange request message, that includes the capability 1210 to the network entity 1206.

The network entity 1206 may transmit a request 1212 for the environment information from the at least one of the positioning neighbor wireless devices 1204. The network entity 1206 may base the request 1212 on the capability 1210, for example by requesting 3D models identified by the capability 1210. The at least one of the positioning neighbor wireless devices 1204 may transmit the environment information 1214 to the network entity 1206. The environment information 1214 may include information collected by the at least one of the positioning neighbor wireless devices 1204 with the wireless device 1202, for example measurements of positioning signals transmitted by the wireless device 1202, measurements of positioning signals measured by at least some of the set of positioning neighbor wireless devices 1204, calculations of attributes of an environment about the wireless device 1202 based on the measurements, and/or environment information obtained by the at least one of the positioning neighbor wireless devices 1204 from other devices. The environment information 1214 may include a 3D model of the requested area, for example as a CAD file or a CAD model. The environment information 1214 may include an indicator that the at least one of the positioning neighbor wireless devices 1204 has available models for the network entity 1206. The environment information 1214 may include an indicator of access rights that the at least one of the positioning neighbor wireless devices 1204 grants to the network entity 1206, or access rights that the network entity 1206 should have in order to access the environment information 1214. The environment information 1214 may include an indicator of a link to a file containing the requested information. The environment information 1214 may include a description of what is within the file, for example limits/ranges of the information within the file, or available model formats that have the information. The environment information 1214 may include an indicator of a 3D model, such as a unique identifier or an identifier of the type of file of the 3D model. The environment information 1214 may include an indicator of how wireless devices with known locations (e.g., TRPs. APs, PRUs) map to the area associated with the model.

In some aspects, the environment information 1214 may include indicators of a plurality of sets of environment information associated with a plurality of areas. In other words, the at least one of the positioning neighbor wireless devices 1204 may be capable of transmitting a set of environment information for each of a plurality of areas. In some aspects, the network entity 1206 may transmit a more specific request to the at least one of the positioning neighbor wireless devices 1204 for a subset of the plurality of sets of environment information. The more specific request may include an indicator of the subset of sets of environment information, or an indicator of a subset of the plurality of areas that correspond with the subset of sets of environment information. In response, the at least one of the positioning neighbor wireless devices 1204 may transmit the subset of sets of environment information to the network entity 1206 for the network entity 1206 to use at 1216.

At 1216, the network entity 1206 may simulate positioning measurements based on the environment information 1214. For example, the network entity 1206 may simulate a set of specular reflection effects on a set of positioning measurements based on the environment information 1214. In another example, the network entity 1206 may simulate a set of non-specular reflection effects on a set of positioning measurements based on the environment information 1214. In another example, the network entity 1206 may simulate a set of diffraction effects on a set of positioning measurements based on the environment information 1214. In another example, the network entity 1206 may simulate a set of scattering effects on a set of positioning measurements based on the environment information 1214.

At 1228, the network entity 1206 may calculate a positioning environment based on the simulations at 1216. At 1230, the network entity 1206 may output the calculated positioning environment, for example by training a positioning model at the network entity 1206, or by transmitting the positioning environment to another device, for example one of the set of positioning neighbor wireless devices 1204, the wireless device 1202, or an OTT server configured to train a positioning model. At 1232, the network entity 1206 may store the positioning environment on a memory of the network entity 1206, for example so that another wireless device may request the positioning environment from the network entity 1206 as environment information to simulate their own set of positioning measurements.

At 1226, the network entity 1206 may obtain positioning measurements from devices, for example, the wireless device 1202, the set of positioning neighbor wireless devices 1204, other UEs, other PRUs, and/or other base stations. The network entity 1206 may receive the positioning measurements as positioning reports. In some aspects, the network entity 1206 may combine the simulated positioning measurements with non-simulated positioning measurements obtained by the network entity 1206 at 1226. The network entity 1206 may be a positioning network entity, such as an LMF or a location server. At 1228, the network entity 1206 may calculate a positioning environment based on the simulated positioning measurements simulated at 1216, and based on the non-simulated positioning measurements obtained at 1226. For example, the network entity 1206 may verify and perform error corrections on simulated positioning measurements based on the non-simulated positioning measurements. At 1230, the network entity 1206 may output the calculated positioning environment, for example by training a positioning model at the network entity 1206, or by transmitting the positioning environment to another device, for example one of the set of positioning neighbor wireless devices 1204, at least one of the positioning neighbor wireless devices 1204, or an OTT server configured to train a positioning model. At 1232, the network entity 1206 may store the positioning environment on a memory of the network entity 1206, for example so that another wireless device may request the positioning environment from the network entity 1206 as environment information to simulate their own set of positioning measurements.

FIG. 13 is a flowchart 1300 of a method of wireless communication. The method may be performed by a wireless device (e.g., the UE 104, the UE 350, the UE 602; the base station 102, the base station 310, the base station 610; the core network 120; the one or more location servers 168; the LMF 166; the wireless device 402, the wireless device 404, the wireless device 406, the wireless device 502, the wireless device 504, the wireless device 506; the AP 604, the AP 606, the AP 608; the positioning target wireless device 702, the positioning target wireless device 802; the positioning target wireless device 902; the positioning target wireless device 1002; the positioning target wireless device 1102; the positioning target wireless device 1202; one of the set of positioning neighbor wireless devices 704, one of the set of positioning neighbor wireless devices 804, one of the set of positioning neighbor wireless devices 904, one of the set of positioning neighbor wireless devices 1004, one of the set of positioning neighbor wireless devices 1104, one of the set of positioning neighbor wireless devices 1204; the network entity 706, the network entity 806, the network entity 906, the network entity 1006, the network entity 1106, the network entity 1206, the network entity 1702, the network entity 1802, the network entity 1960; the apparatus 1604). At 1302, the wireless device may receive environment information associated with an area. For example, 1302 may be performed by the positioning target wireless device 702 in FIG. 7, which may receive the environment information 714 from the network entity 706. The environment information 714 may be associated with an area. For example, the environment information 714 may be a 3D model of the area with attribute information for objects in the 3D model. Moreover, 1302 may be performed by the component 198 in FIG. 1, 3, 17, 18, or 19.

At 1304, the wireless device may simulate a set of positioning measurements based on the environment information. For example, 1304 may be performed by the positioning target wireless device 702 in FIG. 7, which may, at 716, simulate a set of positioning measurements based on the environment information 714. Moreover, 1304 may be performed by the component 198 in FIG. 1, 3, 17, 18, or 19.

At 1306, the wireless device may calculate a positioning environment based on the simulated set of positioning measurements. For example, 1306 may be performed by the positioning target wireless device 702 in FIG. 7, which may, at 728, calculate a positioning environment based on the simulations at 716. Moreover, 1306 may be performed by the component 198 in FIG. 1, 3, 17, 18, or 19.

At 1308, the wireless device may output the positioning environment to train a positioning model. For example, 1308 may be performed by the positioning target wireless device 702 in FIG. 7, which may, at 730, output the positioning environment calculated at 728 to train a positioning model. Moreover, 1308 may be performed by the component 198 in FIG. 1, 3, 17, 18, or 19.

At 1310, the wireless device may output the positioning environment to train a positioning model by training the positioning model at the wireless device based on the positioning environment. For example, 1310 may be performed by the positioning target wireless device 702 in FIG. 7, which may, at 730, train the positioning model at the positioning target wireless device 702 based on the positioning environment calculated at 728. Moreover, 1310 may be performed by the component 198 in FIG. 1, 3, 17, 18, or 19.

At 1312, the wireless device may output the positioning environment to train a positioning model by transmitting the positioning environment to a training entity to train the positioning model. For example, 1312 may be performed by the positioning target wireless device 702 in FIG. 7, which may, at 730, transmit the positioning environment calculated at 728 to a training entity (e.g., the network entity 706, an OTT server, a core network (CN)) to train the positioning model. Moreover, 1312 may be performed by the component 198 in FIG. 1, 3, 17, 18, or 19.

Figure 14:
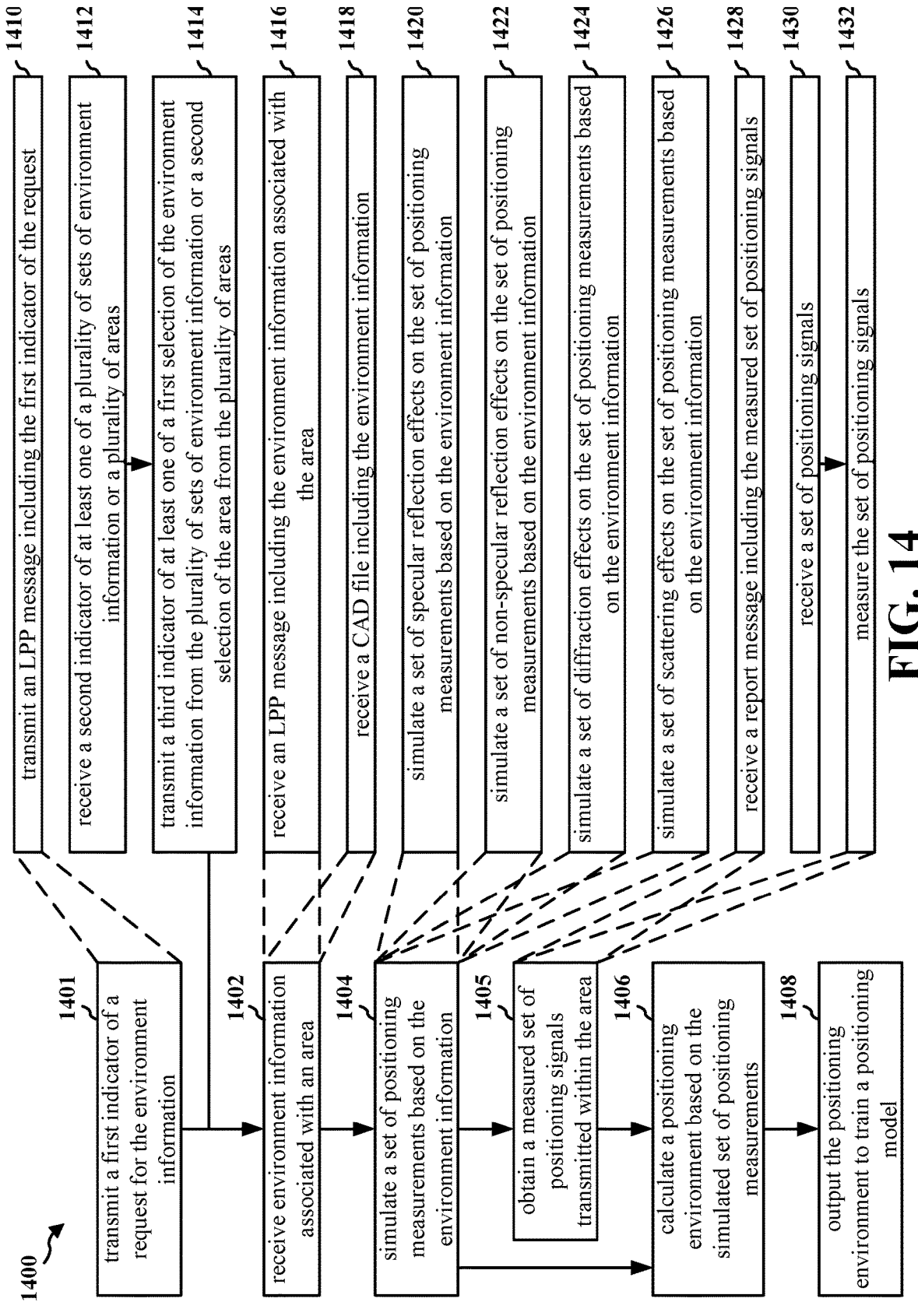
FIG. 14 is a flowchart of a method of wireless communication.

FIG. 14 is a flowchart 1400 of a method of wireless communication. The method may be performed by a wireless device (e.g., the UE 104, the UE 350, the UE 602; the base station 102, the base station 310, the base station 610; the core network 120; the one or more location servers 168; the LMF 166; the wireless device 402, the wireless device 404, the wireless device 406, the wireless device 502, the wireless device 504, the wireless device 506; the AP 604, the AP 606, the AP 608; the positioning target wireless device 702, the positioning target wireless device 802; the positioning target wireless device 902; the positioning target wireless device 1002; the positioning target wireless device 1102; the positioning target wireless device 1202; one of the set of positioning neighbor wireless devices 704, one of the set of positioning neighbor wireless devices 804, one of the set of positioning neighbor wireless devices 904, one of the set of positioning neighbor wireless devices 1004, one of the set of positioning neighbor wireless devices 1104, one of the set of positioning neighbor wireless devices 1204; the network entity 706, the network entity 806, the network entity 906, the network entity 1006, the network entity 1106, the network entity 1206, the network entity 1702, the network entity 1802, the network entity 1960; the apparatus 1604).

At 1401, the wireless device may transmit a first indicator of a request for the environment information. For example, 1401 may be performed by the positioning target wireless device 702 in FIG. 7, which may transmit the request 712 to the network entity 706. The request 712 may include an indicator of a request for the network entity 706 to transmit environment information to the positioning target wireless device 702. Moreover, 1401 may be performed by the component 198 in FIG. 1, 3, 17, 18, or 19.

At 1402, the wireless device may receive environment information associated with an area. For example, 1402 may be performed by the positioning target wireless device 702 in FIG. 7, which may receive the environment information 714 from the network entity 706. The environment information 714 may be associated with an area. For example, the environment information 714 may be a 3D model of the area with attribute information for objects in the 3D model. Moreover, 1402 may be performed by the component 198 in FIG. 1, 3, 17, 18, or 19.

At 1404, the wireless device may simulate a set of positioning measurements based on the environment information. For example, 1404 may be performed by the positioning target wireless device 702 in FIG. 7, which may, at 716, simulate a set of positioning measurements based on the environment information 714. Moreover, 1404 may be performed by the component 198 in FIG. 1, 3, 17, 18, or 19.

At 1405, the wireless device may obtain a measured set of positioning signals transmitted within the area. For example, 1405 may be performed by the positioning target wireless device 702 in FIG. 7, which may obtain a measured set of positioning signals transmitted within the area by receiving the set of positioning signals 724 from the set of positioning neighbor wireless devices 704. In some aspects, the positioning target wireless device 702 may also transmit positioning signals (e.g., SRSs) to the set of positioning neighbor wireless devices 704, which may measure the positioning signals transmitted by the positioning target wireless device 702. The set of positioning neighbor wireless devices 704 may transmit the measurements to the positioning target wireless device 702 for use at 728. Moreover, 1405 may be performed by the component 198 in FIG. 1, 3, 17, 18, or 19.

At 1406, the wireless device may calculate a positioning environment based on the simulated set of positioning measurements. For example, 1406 may be performed by the positioning target wireless device 702 in FIG. 7, which may, at 728, calculate a positioning environment based on the simulations at 716. Moreover, 1406 may be performed by the component 198 in FIG. 1, 3, 17, 18, or 19.

At 1408, the wireless device may output the positioning environment to train a positioning model. For example, 1408 may be performed by the positioning target wireless device 702 in FIG. 7, which may, at 730, output the positioning environment calculated at 728 to train a positioning model. Moreover, 1408 may be performed by the component 198 in FIG. 1, 3, 17, 18, or 19.

At 1410, the wireless device may transmit a first indicator of a request for the environment information by transmitting an LPP message including the first indicator of the request. For example, 1410 may be performed by the positioning target wireless device 702 in FIG. 7, which may transmit an LPP message including the request 712. The LPP message may be an LPP assistance data request message. Moreover, 1410 may be performed by the component 198 in FIG. 1, 3, 17, 18, or 19.

At 1412, the wireless device may receive a second indicator of at least one of a plurality of sets of environment information or a plurality of areas. For example, 1412 may be performed by the positioning target wireless device 702 in FIG. 7, which may receive from the network entity 706, an indicator of a plurality of sets of environment information or a plurality of areas. The environment information 714 may indicate to the positioning target wireless device 702 the plurality of sets of environment information or the plurality of areas that the network entity 706 is able to provide a set of environment information for. Moreover, 1412 may be performed by the component 198 in FIG. 1, 3, 17, 18, or 19.

At 1414, the wireless device may transmit a third indicator of at least one of a first selection of the environment information from the plurality of sets of environment information or a second selection of the area from the plurality of areas. For example, 1414 may be performed by the positioning target wireless device 702 in FIG. 7, which may transmit, to the network entity 706, an indicator of at least one of a first selection of the environment information from the plurality of sets of environment information or a second selection of the area from the plurality of areas. In other words, the positioning target wireless device 702 may select from the plurality of sets of environment information or the plurality of areas that the network entity 706 indicated. Moreover, 1414 may be performed by the component 198 in FIG. 1, 3, 17, 18, or 19.

At 1416, the wireless device may receive environment information associated with an area by receiving an LPP message including the environment information associated with the area. For example, 1416 may be performed by the positioning target wireless device 702 in FIG. 7, which may receive an LPP message including the environment information 714. Moreover, 1416 may be performed by the component 198 in FIG. 1, 3, 17, 18, or 19.

At 1418, the wireless device may receive environment information associated with an area by receiving a CAD file including the environment information. For example, 1418 may be performed by the positioning target wireless device 702 in FIG. 7, which may receive a CAD file including the environment information 714. Moreover, 1418 may be performed by the component 198 in FIG. 1, 3, 17, 18, or 19.

At 1420, the wireless device may simulate a set of positioning measurements based on the environment information by simulating a set of specular reflection effects on the set of positioning measurements based on the environment information. For example, 1420 may be performed by the positioning target wireless device 702 in FIG. 7, which may simulate a set of specular reflection effects on simulated positioning measurements based on the environment information 714. Moreover, 1420 may be performed by the component 198 in FIG. 1, 3, 17, 18, or 19.

At 1422, the wireless device may simulate a set of positioning measurements based on the environment information by simulating a set of non-specular reflection effects on the set of positioning measurements based on the environment information. For example, 1422 may be performed by the positioning target wireless device 702 in FIG. 7, which may simulate a set of non-specular reflection effects on simulated positioning measurements based on the environment information 714. Moreover, 1422 may be performed by the component 198 in FIG. 1, 3, 17, 18, or 19.

At 1424, the wireless device may simulate a set of positioning measurements based on the environment information by simulating a set of diffraction effects on the set of positioning measurements based on the environment information. For example, 1424 may be performed by the positioning target wireless device 702 in FIG. 7, which may simulate a set of diffraction effects on simulated positioning measurements based on the environment information 714. Moreover, 1424 may be performed by the component 198 in FIG. 1, 3, 17, 18, or 19.

In some aspects, the wireless device may simulate a set of positioning measurements based on the environment information by simulating a set of refraction effects on the set of positioning measurements based on the environment information. For example, such a simulation may be performed by the positioning target wireless device 702 in FIG. 7, which may simulate a set of refraction effects on simulated positioning measurements based on the environment information 714. Moreover, such simulations may be performed by the component 198 in FIG. 1, 3, 17, 18, or 19.

At 1426, the wireless device may simulate a set of positioning measurements based on the environment information by simulating a set of scattering effects on the set of positioning measurements based on the environment information. For example, 1426 may be performed by the positioning target wireless device 702 in FIG. 7, which may simulate a set of scattering effects on simulated positioning measurements based on the environment information 714. Moreover, 1426 may be performed by the component 198 in FIG. 1, 3, 17, 18, or 19.

At 1428, the wireless device may obtain a measured set of positioning signals transmitted within the area by receiving a report message including the measured set of positioning signals. For example, 1428 may be performed by the network entity 1106 in FIG. 11, which may, at 1126, receive a report message including measured sets of positioning signals from various devices, for example the positioning target wireless device 1102 or the set of positioning neighbor wireless devices 1104. Moreover, 1428 may be performed by the component 198 in FIG. 1, 3, 17, 18, or 19.

At 1430, the wireless device may receive a set of positioning signals. For example, 1430 may be performed by the positioning target wireless device 702 in FIG. 7, which may receive the set of positioning signals 724 from the set of positioning neighbor wireless devices 704. Moreover, 1430 may be performed by the component 198 in FIG. 1, 3, 17, 18, or 19.

At 1432, the wireless device may obtain a measured set of positioning signals transmitted within the area by measuring the set of positioning signals. For example, 1432 may be performed by the positioning target wireless device 702 in FIG. 7, which may, at 726, measure the set of positioning signals 724. Moreover, 1432 may be performed by the component 198 in FIG. 1, 3, 17, 18, or 19.

Figure 15:
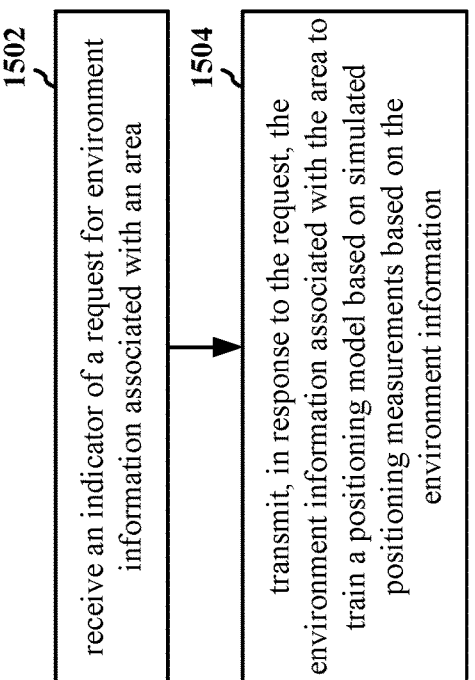
FIG. 15 is a flowchart of a method of wireless communication.

FIG. 15 is a flowchart 1500 of a method of wireless communication. The method may be performed by a wireless device (e.g., the UE 104, the UE 350, the UE 602; the base station 102, the base station 310, the base station 610; the core network 120; the one or more location servers 168; the LMF 166; the wireless device 402, the wireless device 404, the wireless device 406; the AP 604, the AP 606, the AP 608; the positioning target wireless device 702, the positioning target wireless device 802; the positioning target wireless device 902; the positioning target wireless device 1002; the positioning target wireless device 1102; the positioning target wireless device 1202; one of the set of positioning neighbor wireless devices 704, one of the set of positioning neighbor wireless devices 804, one of the set of positioning neighbor wireless devices 904, one of the set of positioning neighbor wireless devices 1004, one of the set of positioning neighbor wireless devices 1104, one of the set of positioning neighbor wireless devices 1204; the network entity 706, the network entity 806, the network entity 906, the network entity 1006, the network entity 1106, the network entity 1206, the network entity 1702, the network entity 1802, the network entity 1960; the apparatus 1604). At 1502, the wireless device may receive an indicator of a request for environment information associated with an area. For example, 1502 may be performed by the network entity 706 in FIG. 7, which may receive the request 712 from the positioning target wireless device 702. The request 712 may include an indicator of a request for the positioning target wireless device 702 to provide environment information associated with an area. Moreover, 1502 may be performed by the component 199 in FIG. 1, 3, 17, 18, or 19.

At 1504, the wireless device may transmit, in response to the request, the environment information associated with the area to train a positioning model based on simulated positioning measurements based on the environment information. For example, 1504 may be performed by the network entity 706 in FIG. 7, which may transmit, in response to the request 712, the environment information 714. The environment information 714 may be associated with an area indicated in the request 712. The positioning target wireless device 702 may use the environment information 714 to train a positioning model based on simulated positioning measurements based on the environment information 714. Moreover, 1504 may be performed by the component 199 in FIG. 1, 3, 17, 18, or 19.

FIG. 16 is a flowchart 1600 of a method of wireless communication. The method may be performed by a wireless device (e.g., the UE 104, the UE 350, the UE 602; the base station 102, the base station 310, the base station 610; the core network 120; the one or more location servers 168; the LMF 166; the wireless device 402, the wireless device 404, the wireless device 406; the AP 604, the AP 606, the AP 608; the positioning target wireless device 702, the positioning target wireless device 802; the positioning target wireless device 902; the positioning target wireless device 1002; the positioning target wireless device 1102; the positioning target wireless device 1202; one of the set of positioning neighbor wireless devices 704, one of the set of positioning neighbor wireless devices 804, one of the set of positioning neighbor wireless devices 904, one of the set of positioning neighbor wireless devices 1004, one of the set of positioning neighbor wireless devices 1104, one of the set of positioning neighbor wireless devices 1204; the network entity 706, the network entity 806, the network entity 906, the network entity 1006, the network entity 1106, the network entity 1206, the network entity 1702, the network entity 1802, the network entity 1960; the apparatus 1604). At 1602, the wireless device may receive an indicator of a request for environment information associated with an area. For example, 1602 may be performed by the network entity 706 in FIG. 7, which may receive the request 712 from the positioning target wireless device 702. The request 712 may include an indicator of a request for the positioning target wireless device 702 to provide environment information associated with an area. Moreover, 1602 may be performed by the component 199 in FIG. 1, 3, 17, 18, or 19.

At 1604, the wireless device may transmit, in response to the request, the environment information associated with the area to train a positioning model based on simulated positioning measurements based on the environment information. For example, 1604 may be performed by the network entity 706 in FIG. 7, which may transmit, in response to the request 712, the environment information 714. The environment information 714 may be associated with an area indicated in the request 712. The positioning target wireless device 702 may use the environment information 714 to train a positioning model based on simulated positioning measurements based on the environment information 714. Moreover, 1604 may be performed by the component 199 in FIG. 1, 3, 17, 18, or 19.

At 1606, the wireless device may receive an indicator of a request for environment information associated with an area by receiving an LPP message including the indicator of the request. For example, 1606 may be performed by the network entity 706 in FIG. 7, which may receive an LPP message including the request 712. Moreover, 1606 may be performed by the component 199 in FIG. 1, 3, 17, 18, or 19.

At 1608, the wireless device may transmit a second indicator of at least one of a plurality of sets of environment information or a plurality of areas. For example, 1608 may be performed by the network entity 706 in FIG. 7, which may transmit, to the positioning target wireless device 702 an indicator of at least one of a plurality of sets of environment information or a plurality of areas. Moreover, 1608 may be performed by the component 199 in FIG. 1, 3, 17, 18, or 19.

At 1610, the wireless device may receive a third indicator of at least one of a first selection of the environment information from the plurality of sets of environment information or a second selection of the area from the plurality of areas before transmitting the environment information. For example, 1610 may be performed by the network entity 706 in FIG. 7, which may receive, from the positioning target wireless device 702, an indicator of at least one of a first selection of the environment information from the plurality of sets of environment information or a second selection of the area from the plurality of areas. Moreover, 1610 may be performed by the component 199 in FIG. 1, 3, 17, 18, or 19.

At 1612, the wireless device may transmit the environment information by transmitting a CAD file including the environment information. For example, 1612 may be performed by the network entity 706 in FIG. 7, which may transmit a CAD file including the environment information 714. Moreover, 1612 may be performed by the component 199 in FIG. 1, 3, 17, 18, or 19.

At 1614, the wireless device may transmit the environment information by transmitting an LPP assistance data response message including the environment information associated with the area. For example, 1614 may be performed by the network entity 706 in FIG. 7, which may transmit an LPP assistance data response message including the environment information 714. Moreover, 1614 may be performed by the component 199 in FIG. 1, 3, 17, 18, or 19.

At 1616, the wireless device may transmit a first configuration message including a first configuration to transmit a set of positioning signals within the area. For example, 1616 may be performed by the network entity 706 in FIG. 7, which may transmit the set of configurations 722 to the set of positioning neighbor wireless devices 704. The set of configurations 722 may include a configuration to transmit the set of positioning signals 724 to the positioning target wireless device 702. Moreover, 1616 may be performed by the component 199 in FIG. 1, 3, 17, 18, or 19.

At 1618, the wireless device may transmit a second configuration message including a second configuration to measure the set of positioning signals to train the positioning model further based on measurements of the set of positioning signals. For example, 1618 may be performed by the network entity 706 in FIG. 7, which may transmit the set of configurations 720 to the positioning target wireless device 702. The set of configurations 720 may include a configuration for the positioning target wireless device 702 to measure the set of positioning signals 724 to train the positioning model further based on measurements of the set of positioning signals. Moreover, 1618 may be performed by the component 199 in FIG. 1, 3, 17, 18, or 19.

At 1620, the wireless device may receive a first report message including a set of measured positioning signals. For example, 1620 may be performed by the network entity 1106 in FIG. 1, which may, at 1126, receive a report message including a set of measured positioning signals. Moreover, 1620 may be performed by the component 199 in FIG. 1, 3, 17, 18, or 19.

At 1622, the wireless device may transmit a second report message including the set of measured positioning signals to train the positioning model further based on the set of measured positioning signals. For example, 1622 may be performed by the network entity 706 in FIG. 7, which may, at 1130, transmit a report message including the set of measured positioning signals to train the positioning model further based on the set of measured positioning signals. Moreover, 1622 may be performed by the component 199 in FIG. 1, 3, 17, 18, or 19.

Figure 17:
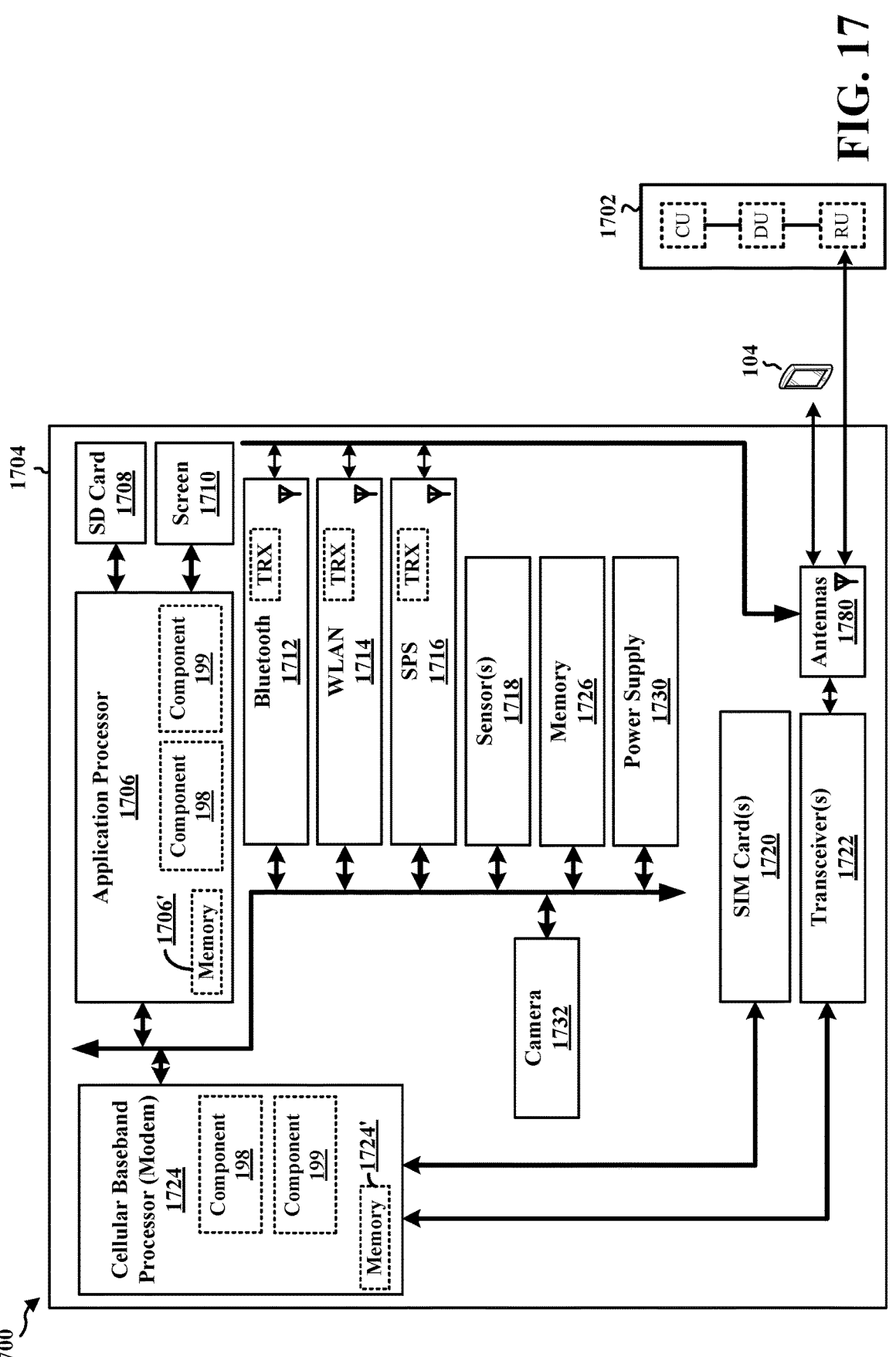
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include at least one cellular baseband processor 1724 (also referred to as a modem) coupled to one or more transceivers 1722 (e.g., cellular RF transceiver). The cellular baseband processor(s) 1724 may include at least one on-chip memory 1724'. In some aspects, the apparatus 1704 may further include one or more subscriber identity modules (SIM) cards 1720 and at least one application processor 1706 coupled to a secure digital (SD) card 1708 and a screen 1710. The application processor(s) 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor(s) 1724 communicates through the transceiver(s) 1722 via one or more antennas 1780 with the UE 104 and/or with an RU associated with a network entity 1702. The cellular baseband processor(s) 1724 and the application processor(s) 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor(s) 1724 and the application processor(s) 1706 are each responsible for general processing, including the execution of software stored on the computer-readable medium/memory. The software, when executed by the cellular baseband processor(s) 1724/application processor(s) 1706, causes the cellular baseband processor(s) 1724/application processor(s) 1706 to perform the various functions described supra. The cellular baseband processor(s) 1724 and the application processor(s) 1706 are configured to perform the various functions described supra based at least in part of the information stored in the memory. That is, the cellular baseband processor(s) 1724 and the application processor(s) 1706 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1724/application processor(s) 1706 when executing software. The cellular baseband processor(s) 1724/application processor(s) 1706 may be a component of the UE 350 and may include the at least one memory 360 and/or at least one of the TX processor 368, the RX processor 356, and the controller/processor 359. In one configuration, the apparatus 1704 may be at least one processor chip (modem and/or application) and include just the cellular baseband processor(s) 1724 and/or the application processor(s) 1706, and in another configuration, the apparatus 1704 may be the entire UE (e.g., see UE 350 of FIG. 3) and include the additional modules of the apparatus 1704.

As discussed supra, the component 198 may be configured to receive environment information associated with an area. The component 198 may be configured to simulate a set of positioning measurements based on the environment information. The component 198 may be configured to calculate a positioning environment based on the simulated set of positioning measurements. The component 198 may be configured to calculate the positioning environment further based on a set of measured positioning signals obtained by the component 198, for example received from another UE 104/base station 102 or measured by the UE 104/base station 102. The component 198 may be configured to output the positioning environment to train a positioning model. The component 198 may be configured to output the positioning environment by training the positioning model at the UE 104/base station 102 based on the positioning environment. The component 198 may be configured to output the positioning environment by transmitting the positioning environment to a training entity to train the positioning model. The component 198 may be within the cellular baseband processor(s) 1724, the application processor(s) 1706, or both the cellular baseband processor(s) 1724 and the application processor(s) 1706. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1704 may include a variety of components configured for various functions. In one configuration, the apparatus 1704, and in particular the cellular baseband processor(s) 1724 and/or the application processor(s) 1706, may include means for receiving environment information associated with an area. The apparatus 1704 may include means for simulating a set of positioning measurements based on the environment information. The apparatus 1704 may include means for calculating a positioning environment based on the simulated set of positioning measurements. The apparatus 1704 may include means for outputting the positioning environment to train a positioning model. The environment information may include at least one of (a) a set of dimension attributes for an object within the area, (b) a set of material attributes for the object within the area, (c) or a set of location attributes for the object within the area. The apparatus 1704 may include means for simulating the set of positioning measurements based on the environment information by simulating a set of specular reflection effects on the set of positioning measurements based on the environment information. The apparatus 1704 may include means for simulating the set of positioning measurements based on the environment information by simulating a set of non-specular reflection effects on the set of positioning measurements based on the environment information. The apparatus 1704 may include means for simulating the set of positioning measurements based on the environment information by simulating a set of diffraction effects on the set of positioning measurements based on the environment information. The apparatus 1704 may include means for simulating the set of positioning measurements based on the environment information by simulating a set of scattering effects on the set of positioning measurements based on the environment information. The apparatus 1704 may include means for obtaining a measured set of positioning signals transmitted within the area. The apparatus 1704 may include means for calculating the positioning environment by calculating the positioning environment further based on the measured set of positioning signals. The apparatus 1704 may include means for obtaining the measured set of positioning signals by receiving a report message including the measured set of positioning signals. The apparatus 1704 may include means for obtaining the measured set of positioning signals by receiving a set of positioning signals and by measuring the set of positioning signals. The apparatus 1704 may include means for outputting the positioning environment by training the positioning model at the apparatus 1704 based on the positioning environment. The apparatus 1704 may include means for outputting the positioning environment by transmitting the positioning environment to an entity (e.g., a training entity) to train the positioning model. The apparatus 1704 may include means for receiving the environment information by receiving a CAD file including the environment information. The apparatus 1704 may include means for transmitting a first indicator of a request for the environment information before receiving the environment information. The request may include at least one of (a) a second indicator of a set of file formats supported by the apparatus 1704 for processing the environment information, (b) a third indicator of a set of environment attributes supported by the apparatus 1704 for processing the environment information or (c) a fourth indicator of a location of the apparatus 1704. The apparatus 1704 may include means for receiving a second indicator of at least one of a plurality of sets of environment information or a plurality of areas. The plurality of sets of environment information may include the environment information. The plurality of areas may include the area. The apparatus 1704 may include means for transmitting a third indicator of at least one of a first selection of the environment information from the plurality of sets of environment information and/or a second selection of the area from the plurality of areas before receiving the environment information. The apparatus 1704 may include means for transmitting the first indicator of the request by transmitting an LPP message including the first indicator of the request. The LPP message may include an assistance data request message. The apparatus 1704 may include means for receiving the environment information associated with the area by receiving an LPP message including the environment information associated with the area. The LPP message may include at least one of an LPP broadcast message or an LPP assistance data response message. The apparatus 1704 may include at least one of a UE or a PRU. The means may be the component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

As discussed supra, the component 199 may be configured to receive an indicator of a request for environment information associated with an area. The component 199 may be configured to transmit, in response to the request, the environment information associated with the area to train a positioning model based on simulated positioning measurements based on the environment information. The component 199 may be within the cellular baseband processor(s) 1724, the application processor(s) 1706, or both the cellular baseband processor(s) 1724 and the application processor(s) 1706. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1704 may include a variety of components configured for various functions. In one configuration, the apparatus 1704, and in particular the cellular baseband processor(s) 1724 and/or the application processor(s) 1706, may include means for receiving an indicator of a request for environment information associated with an area. The apparatus 1704 may include means for transmitting, in response to the request, the environment information associated with the area to train a positioning model based on simulated positioning measurements based on the environment information. The apparatus 1704 may include means for transmitting a first configuration message including a first configuration to transmit a set of positioning signals within the area. The apparatus 1704 may include means for transmitting a second configuration message including a second configuration to measure the set of positioning signals to train the positioning model further based on measurements of the set of positioning signals. The environment information may include at least one of (a) a set of dimension attributes for an object within the area, (b) a set of material attributes for the object within the area or (c) a set of location attributes for the object within the area. The apparatus 1704 may include means for receiving a first report message including a set of measured positioning signals. The apparatus 1704 may include means for transmitting a second report message including the set of measured positioning signals to train the positioning model further based on the set of measured positioning signals. The apparatus 1704 may include means for receiving a positioning environment based on the simulated positioning measurements. The apparatus 1704 may include means for training the positioning model based on the positioning environment. The apparatus 1704 may include means for transmitting the environment information by transmitting a CAD file including the environment information. The request may include at least one of (a) a second indicator of a set of file formats supported by the wireless device for processing the environment information, (b) a third indicator of a set of environment attributes supported by the wireless device for processing the environment information and/or (c) a fourth indicator of a location of the wireless device. The apparatus 1704 may include means for transmitting a second indicator of at least one of a plurality of sets of environment information and/or a plurality of areas. The plurality of sets of environment information may include the environment information. The plurality of areas includes the area. The apparatus 1704 may include means for receiving a third indicator of at least one of a first selection of the environment information from the plurality of sets of environment information or a second selection of the area from the plurality of areas before transmitting the environment information. The apparatus 1704 may include means for receiving the indicator of the request by: receiving an LPP message including the indicator of the request. The LPP message may include an assistance data request message. The apparatus 1704 may include means for transmitting the environment information associated with the area by transmitting an LPP message including the environment information associated with the area. The LPP message may include at least one of an LPP broadcast message or an LPP assistance data response message. The apparatus 1704 may include at least one of a UE or a PRU. The means may be the component 199 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

Figure 18:
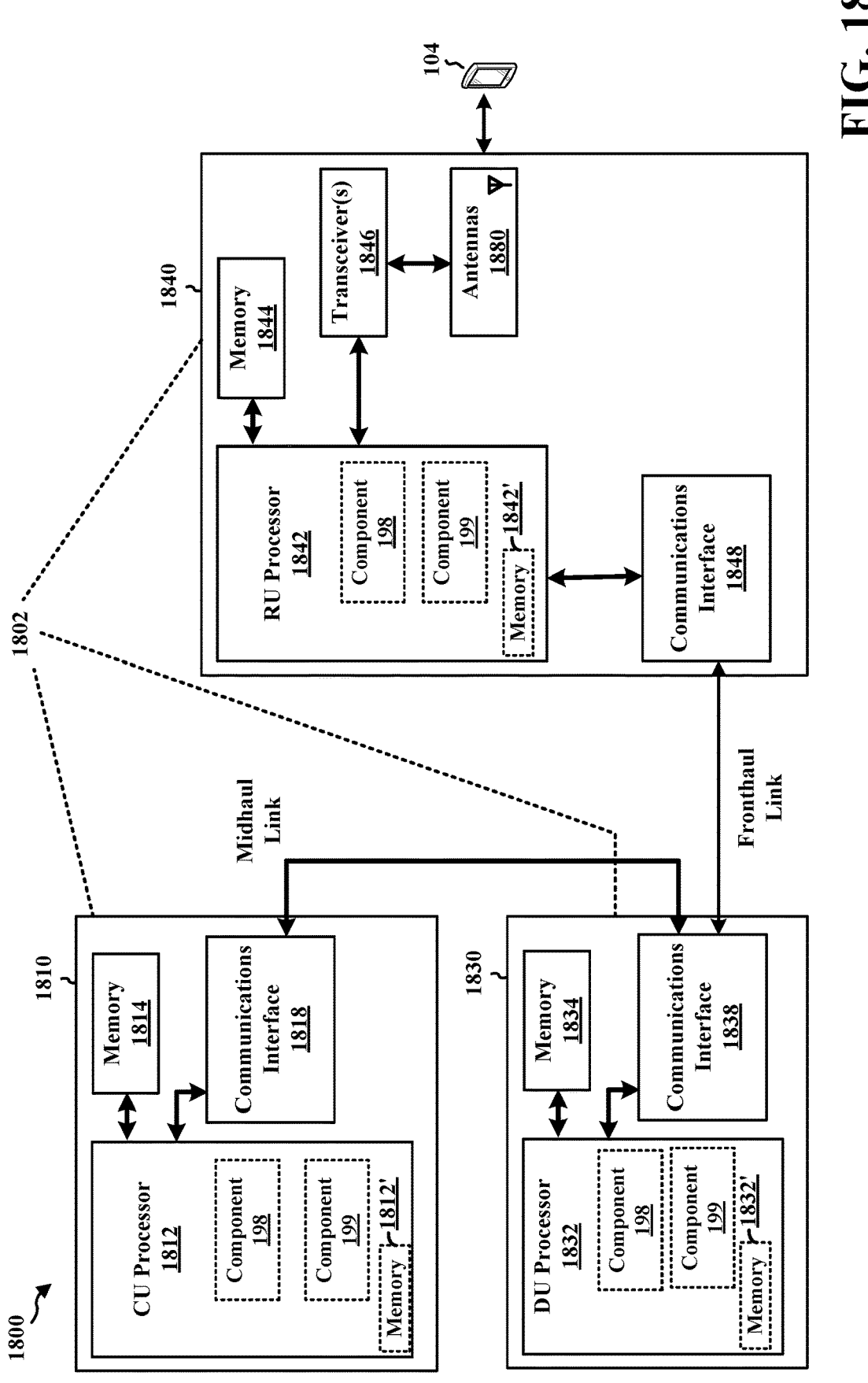
FIG. 18 is a diagram illustrating an example of a hardware implementation for an example network entity.

FIG. 18 is a diagram 1800 illustrating an example of a hardware implementation for a network entity 1802. The network entity 1802 may be a BS, a component of a BS, or may implement BS functionality. The network entity 1802 may include at least one of a CU 1810, a DU 1830, or an RU 1840. For example, depending on the layer functionality handled by the component 199, the network entity 1802 may include the CU 1810; both the CU 1810 and the DU 1830; each of the CU 1810, the DU 1830, and the RU 1840; the DU 1830; both the DU 1830 and the RU 1840; or the RU 1840. The CU 1810 may include at least one CU processor 1812. The CU processor(s) 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include at least one DU processor 1832. The DU processor(s) 1832 may include on-chip memory 1832'. In some aspects, the DU 1830 may further include additional memory modules 1834 and a communications interface 1838. The DU 1830 communicates with the RU 1840 through a fronthaul link. The RU 1840 may include at least one RU processor 1842. The RU processor(s) 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to receive environment information associated with an area. The component 198 may be configured to simulate a set of positioning measurements based on the environment information. The component 198 may be configured to calculate a positioning environment based on the simulated set of positioning measurements. The component 198 may be configured to calculate the positioning environment further based on a set of measured positioning signals obtained by the component 198, for example received from another UE 104/base station 102 or measured by the UE 104/base station 102. The component 198 may be configured to output the positioning environment to train a positioning model. The component 198 may be configured to output the positioning environment by training the positioning model at the UE 104/base station 102 based on the positioning environment. The component 198 may be configured to output the positioning environment by transmitting the positioning environment to a training entity to train the positioning model. The component 198 may be within one or more processors of one or more of the CU 1810, DU 1830, and the RU 1840. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1802 may include a variety of components configured for various functions. In one configuration, the network entity 1802 may include means for receiving environment information associated with an area. The network entity 1802 may include means for simulating a set of positioning measurements based on the environment information. The network entity 1802 may include means for calculating a positioning environment based on the simulated set of positioning measurements. The network entity 1802 may include means for outputting the positioning environment to train a positioning model. The environment information may include at least one of (a) a set of dimension attributes for an object within the area, (b) a set of material attributes for the object within the area. (c) or a set of location attributes for the object within the area. The network entity 1802 may include means for simulating the set of positioning measurements based on the environment information by simulating a set of specular reflection effects on the set of positioning measurements based on the environment information. The network entity 1802 may include means for simulating the set of positioning measurements based on the environment information by simulating a set of non-specular reflection effects on the set of positioning measurements based on the environment information. The network entity 1802 may include means for simulating the set of positioning measurements based on the environment information by simulating a set of diffraction effects on the set of positioning measurements based on the environment information. The network entity 1802 may include means for simulating the set of positioning measurements based on the environment information by simulating a set of scattering effects on the set of positioning measurements based on the environment information. The network entity 1802 may include means for obtaining a measured set of positioning signals transmitted within the area. The network entity 1802 may include means for calculating the positioning environment by calculating the positioning environment further based on the measured set of positioning signals. The network entity 1802 may include means for obtaining the measured set of positioning signals by receiving a report message including the measured set of positioning signals. The network entity 1802 may include means for obtaining the measured set of positioning signals by receiving a set of positioning signals and by measuring the set of positioning signals. The network entity 1802 may include means for outputting the positioning environment by training the positioning model at the network entity 1802 based on the positioning environment. The network entity 1802 may include means for outputting the positioning environment by transmitting the positioning environment to an entity (e.g., a training entity) to train the positioning model. The network entity 1802 may include means for receiving the environment information by receiving a CAD file including the environment information. The network entity 1802 may include means for transmitting a first indicator of a request for the environment information before receiving the environment information. The request may include at least one of (a) a second indicator of a set of file formats supported by the network entity 1802 for processing the environment information, (b) a third indicator of a set of environment attributes supported by the network entity 1802 for processing the environment information or (c) a fourth indicator of a location of the network entity 1802. The network entity 1802 may include means for receiving a second indicator of at least one of a plurality of sets of environment information or a plurality of areas. The plurality of sets of environment information may include the environment information. The plurality of areas may include the area. The network entity 1802 may include means for transmitting a third indicator of at least one of a first selection of the environment information from the plurality of sets of environment information and/or a second selection of the area from the plurality of areas before receiving the environment information. The network entity 1802 may include means for transmitting the first indicator of the request by transmitting an LPP message including the first indicator of the request. The LPP message may include an assistance data request message. The network entity 1802 may include means for receiving the environment information associated with the area by receiving an LPP message including the environment information associated with the area. The LPP message may include at least one of an LPP broadcast message or an LPP assistance data response message. The network entity 1802 may include at least one of a network node, a base station, a TRP, or an LMF. The means may be the component 198 of the network entity 1802 configured to perform the functions recited by the means. As described supra, the network entity 1802 may include the TX processor 316, the RX processor 370, and the controller/processor 375. As such, in one configuration, the means may be the TX processor 316, the RX processor 370, and/or the controller/processor 375 configured to perform the functions recited by the means.

As discussed supra, the component 199 may be configured to receive an indicator of a request for environment information associated with an area. The component 199 may be configured to transmit, in response to the request, the environment information associated with the area to train a positioning model based on simulated positioning measurements based on the environment information. The component 199 may be within one or more processors of one or more of the CU 1810, DU 1830, and the RU 1840. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1802 may include a variety of components configured for various functions. In one configuration, the network entity 1802 may include means for receiving an indicator of a request for environment information associated with an area. The network entity 1802 may include means for transmitting, in response to the request, the environment information associated with the area to train a positioning model based on simulated positioning measurements based on the environment information. The network entity 1802 may include means for transmitting a first configuration message including a first configuration to transmit a set of positioning signals within the area. The network entity 1802 may include means for transmitting a second configuration message including a second configuration to measure the set of positioning signals to train the positioning model further based on measurements of the set of positioning signals. The environment information may include at least one of (a) a set of dimension attributes for an object within the area, (b) a set of material attributes for the object within the area or (c) a set of location attributes for the object within the area. The network entity 1802 may include means for receiving a first report message including a set of measured positioning signals. The network entity 1802 may include means for transmitting a second report message including the set of measured positioning signals to train the positioning model further based on the set of measured positioning signals. The network entity 1802 may include means for receiving a positioning environment based on the simulated positioning measurements. The network entity 1802 may include means for training the positioning model based on the positioning environment. The network entity 1802 may include means for transmitting the environment information by transmitting a CAD file including the environment information. The request may include at least one of (a) a second indicator of a set of file formats supported by the wireless device for processing the environment information, (b) a third indicator of a set of environment attributes supported by the wireless device for processing the environment information and/or (c) a fourth indicator of a location of the wireless device. The network entity 1802 may include means for transmitting a second indicator of at least one of a plurality of sets of environment information and/or a plurality of areas. The plurality of sets of environment information may include the environment information. The plurality of areas includes the area. The network entity 1802 may include means for receiving a third indicator of at least one of a first selection of the environment information from the plurality of sets of environment information or a second selection of the area from the plurality of areas before transmitting the environment information. The network entity 1802 may include means for receiving the indicator of the request by: receiving an LPP message including the indicator of the request. The LPP message may include an assistance data request message. The network entity 1802 may include means for transmitting the environment information associated with the area by transmitting an LPP message including the environment information associated with the area. The LPP message may include at least one of an LPP broadcast message or an LPP assistance data response message. The network entity 1802 may include at least one of a network node, a base station, a TRP, or an LMF. The means may be the component 199 of the network entity 1802 configured to perform the functions recited by the means. As described supra, the network entity 1802 may include the TX processor 316, the RX processor 370, and the controller/processor 375. As such, in one configuration, the means may be the TX processor 316, the RX processor 370, and/or the controller/processor 375 configured to perform the functions recited by the means.

Figure 19:
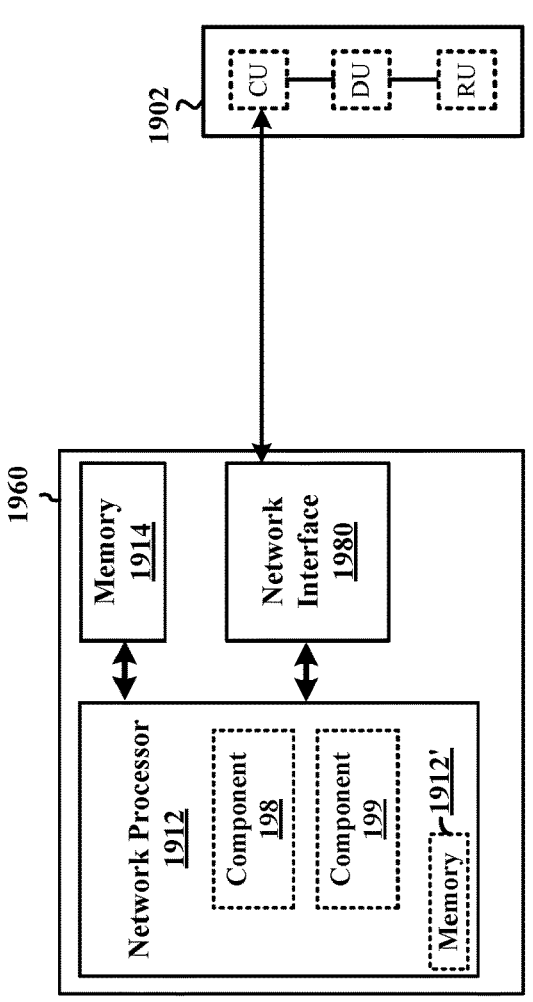
FIG. 19 is a diagram illustrating an example of a hardware implementation for an example network entity.

FIG. 19 is a diagram 1900 illustrating an example of a hardware implementation for a network entity 1960. In one example, the network entity 1960 may be within the core network 120. The network entity 1960 may include at least one network processor 1912. The network processor(s) 1912 may include on-chip memory 1912'. In some aspects, the network entity 1960 may further include additional memory modules 1914. The network entity 1960 communicates via the network interface 1980 directly (e.g., backhaul link) or indirectly (e.g., through a RIC) with the CU 1902. The on-chip memory 1912' and the additional memory modules 1914 may each be considered a computer-readable medium/memory. Each computer-readable medium/memory may be non-transitory. The network processor(s) 1912 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to receive environment information associated with an area. The component 198 may be configured to simulate a set of positioning measurements based on the environment information. The component 198 may be configured to calculate a positioning environment based on the simulated set of positioning measurements. The component 198 may be configured to calculate the positioning environment further based on a set of measured positioning signals obtained by the component 198, for example received from another UE 104/base station 102 or measured by the UE 104/base station 102. The component 198 may be configured to output the positioning environment to train a positioning model. The component 198 may be configured to output the positioning environment by training the positioning model at the UE 104/base station 102 based on the positioning environment. The component 198 may be configured to output the positioning environment by transmitting the positioning environment to a training entity to train the positioning model. The component 198 may be within the network processor(s) 1912. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1960 may include a variety of components configured for various functions. In one configuration, the network entity 1960 may include means for receiving environment information associated with an area. The network entity 1960 may include means for simulating a set of positioning measurements based on the environment information. The network entity 1960 may include means for calculating a positioning environment based on the simulated set of positioning measurements. The network entity 1960 may include means for outputting the positioning environment to train a positioning model. The environment information may include at least one of (a) a set of dimension attributes for an object within the area, (b) a set of material attributes for the object within the area, (c) or a set of location attributes for the object within the area. The network entity 1960 may include means for simulating the set of positioning measurements based on the environment information by simulating a set of specular reflection effects on the set of positioning measurements based on the environment information. The network entity 1960 may include means for simulating the set of positioning measurements based on the environment information by simulating a set of non-specular reflection effects on the set of positioning measurements based on the environment information. The network entity 1960 may include means for simulating the set of positioning measurements based on the environment information by simulating a set of diffraction effects on the set of positioning measurements based on the environment information. The network entity 1960 may include means for simulating the set of positioning measurements based on the environment information by simulating a set of scattering effects on the set of positioning measurements based on the environment information. The network entity 1960 may include means for obtaining a measured set of positioning signals transmitted within the area. The network entity 1960 may include means for calculating the positioning environment by calculating the positioning environment further based on the measured set of positioning signals. The network entity 1960 may include means for obtaining the measured set of positioning signals by receiving a report message including the measured set of positioning signals. The network entity 1960 may include means for obtaining the measured set of positioning signals by receiving a set of positioning signals and by measuring the set of positioning signals. The network entity 1960 may include means for outputting the positioning environment by training the positioning model at the network entity 1960 based on the positioning environment. The network entity 1960 may include means for outputting the positioning environment by transmitting the positioning environment to an entity (e.g., a training entity) to train the positioning model. The network entity 1960 may include means for receiving the environment information by receiving a CAD file including the environment information. The network entity 1960 may include means for transmitting a first indicator of a request for the environment information before receiving the environment information. The request may include at least one of (a) a second indicator of a set of file formats supported by the network entity 1960 for processing the environment information, (b) a third indicator of a set of environment attributes supported by the network entity 1960 for processing the environment information or (c) a fourth indicator of a location of the network entity 1960. The network entity 1960 may include means for receiving a second indicator of at least one of a plurality of sets of environment information or a plurality of areas. The plurality of sets of environment information may include the environment information. The plurality of areas may include the area. The network entity 1960 may include means for transmitting a third indicator of at least one of a first selection of the environment information from the plurality of sets of environment information and/or a second selection of the area from the plurality of areas before receiving the environment information. The network entity 1960 may include means for transmitting the first indicator of the request by transmitting an LPP message including the first indicator of the request. The LPP message may include an assistance data request message. The network entity 1960 may include means for receiving the environment information associated with the area by receiving an LPP message including the environment information associated with the area. The LPP message may include at least one of an LPP broadcast message or an LPP assistance data response message. The network entity 1960 may include at least one of a network node, a base station, or an LMF. The means may be the component 198 of the network entity 1960 configured to perform the functions recited by the means.

As discussed supra, the component 199 may be configured to receive an indicator of a request for environment information associated with an area. The component 199 may be configured to transmit, in response to the request, the environment information associated with the area to train a positioning model based on simulated positioning measurements based on the environment information. The component 199 may be within the network processor(s) 1912. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1960 may include a variety of components configured for various functions. In one configuration, the network entity 1960 may include means for receiving an indicator of a request for environment information associated with an area. The network entity 1960 may include means for transmitting, in response to the request, the environment information associated with the area to train a positioning model based on simulated positioning measurements based on the environment information. The network entity 1960 may include means for transmitting a first configuration message including a first configuration to transmit a set of positioning signals within the area. The network entity 1960 may include means for transmitting a second configuration message including a second configuration to measure the set of positioning signals to train the positioning model further based on measurements of the set of positioning signals. The environment information may include at least one of (a) a set of dimension attributes for an object within the area. (b) a set of material attributes for the object within the area or (c) a set of location attributes for the object within the area. The network entity 1960 may include means for receiving a first report message including a set of measured positioning signals. The network entity 1960 may include means for transmitting a second report message including the set of measured positioning signals to train the positioning model further based on the set of measured positioning signals. The network entity 1960 may include means for receiving a positioning environment based on the simulated positioning measurements. The network entity 1960 may include means for training the positioning model based on the positioning environment. The network entity 1960 may include means for transmitting the environment information by transmitting a CAD file including the environment information. The request may include at least one of (a) a second indicator of a set of file formats supported by the wireless device for processing the environment information, (b) a third indicator of a set of environment attributes supported by the wireless device for processing the environment information and/or (c) a fourth indicator of a location of the wireless device. The network entity 1960 may include means for transmitting a second indicator of at least one of a plurality of sets of environment information and/or a plurality of areas. The plurality of sets of environment information may include the environment information. The plurality of areas includes the area. The network entity 1960 may include means for receiving a third indicator of at least one of a first selection of the environment information from the plurality of sets of environment information or a second selection of the area from the plurality of areas before transmitting the environment information. The network entity 1960 may include means for receiving the indicator of the request by: receiving an LPP message including the indicator of the request. The LPP message may include an assistance data request message. The network entity 1960 may include means for transmitting the environment information associated with the area by transmitting an LPP message including the environment information associated with the area. The LPP message may include at least one of an LPP broadcast message or an LPP assistance data response message. The network entity 1960 may include at least one of a network node, a base station, a TRP, or an LMF. The means may be the component 199 of the network entity 1960 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, may send the data to a component of the device that transmits the data, or may send the data to a component of the device. A device configured to "obtain" data, such as a transmission, signal, or message, may receive, for example with a transceiver, may obtain the data from a component of the device that receives the data via a transmission, or may obtain the data from a component of the device. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, comprising: receiving environment information associated with an area; simulating a set of positioning measurements based on the environment information; calculating a positioning environment based on the simulated set of positioning measurements; and outputting the positioning environment to train a positioning model.

Aspect 2 is the method of aspect 1, wherein the environment information comprises at least one of: a set of dimension attributes for an object within the area; a set of material attributes for the object within the area; or a set of location attributes for the object within the area.

Aspect 3 is the method of either of the aspects 1 or 2, wherein simulating the set of positioning measurements based on the environment information comprises at least one of: simulating a set of specular reflection effects on the set of positioning measurements based on the environment information; simulating a set of non-specular reflection effects on the set of positioning measurements based on the environment information; simulating a set of diffraction effects on the set of positioning measurements based on the environment information; or simulating a set of scattering effects on the set of positioning measurements based on the environment information.

Aspect 4 is the method of any of aspects 1 to 3, further comprising: obtaining a measured set of positioning signals transmitted within the area, wherein calculating the positioning environment comprises calculating the positioning environment further based on the measured set of positioning signals.

Aspect 5 is the method of aspect 4, wherein obtaining the measured set of positioning signals comprises receiving a report message comprising the measured set of positioning signals.

Aspect 6 is the method of either of aspects 4 or 5, wherein obtaining the measured set of positioning signals comprises: receiving a set of positioning signals; and measuring the set of positioning signals.

Aspect 7 is the method of any of aspects 1 to 6, wherein outputting the positioning environment comprises training the positioning model at the wireless device based on the positioning environment.

Aspect 8 is the method of any of aspects 1 to 7, wherein outputting the positioning environment comprises transmitting the positioning environment to a training entity to train the positioning model.

Aspect 9 is the method of any of aspects 1 to 8, wherein receiving the environment information comprises receiving a computer-aided design (CAD) file including the environment information.

Aspect 10 is the method of any of aspects 1 to 9, further comprising: transmitting a first indicator of a request for the environment information before receiving the environment information.

Aspect 11 is the method of aspect 10, wherein the request comprises at least one of: a second indicator of a set of file formats supported by the wireless device for processing the environment information; a third indicator of a set of environment attributes supported by the wireless device for processing the environment information; or a fourth indicator of a location of the wireless device.

Aspect 12 is the method of and of aspects 1 to 11, further comprising: receiving a second indicator of at least one of a plurality of sets of environment information or a plurality of areas, wherein the plurality of sets of environment information comprises the environment information, wherein the plurality of areas comprises the area; and transmitting a third indicator of at least one of a first selection of the environment information from the plurality of sets of environment information or a second selection of the area from the plurality of areas before receiving the environment information.

Aspect 13 is the method of any of aspects 10 to 12, wherein transmitting the first indicator of the request comprises transmitting a long-term evolution (LTE) positioning protocol (LPP) message comprising the first indicator of the request.

Aspect 14 is the method of aspect 13, wherein the LPP message comprises an assistance data request message.

Aspect 15 is the method of any of aspects 1 to 14, wherein receiving the environment information associated with the area comprises receiving a long-term evolution (LTE) positioning protocol (LPP) message comprising the environment information associated with the area.

Aspect 16 is the method of aspect 15, wherein the LPP message comprises at least one of an LPP broadcast message or an LPP assistance data response message.

Aspect 17 is the method of any of aspects 1 to 16, wherein the wireless device includes at least one of: a user equipment (UE); a positioning reference unit (PRU); a network node; a base station; a transmission reception point (TRP); a network entity; or a location management function (LMF). In some aspects, the network entity or LMF may not have a wireless transceiver, but may be configured to communicate with a wireless device, for example via a base station or an RU.

Aspect 18 is a method of wireless communication at a wireless device, comprising: receiving an indicator of a request for environment information associated with an area; and transmitting, in response to the request, the environment information associated with the area to train a positioning model based on simulated positioning measurements based on the environment information.

Aspect 19 is the method of aspect 18, further comprising: transmitting a first configuration message comprising a first configuration to transmit a set of positioning signals within the area; and transmitting a second configuration message comprising a second configuration to measure the set of positioning signals to train the positioning model further based on measurements of the set of positioning signals.

Aspect 20 is the method of either of aspects 18 or 19, wherein the environment information comprises at least one of: a set of dimension attributes for an object within the area; a set of material attributes for the object within the area; or a set of location attributes for the object within the area.

Aspect 21 is the method of any of aspects 18 to 20, further comprising: receiving a first report message comprising a set of measured positioning signals; and transmitting a second report message comprising the set of measured positioning signals to train the positioning model further based on the set of measured positioning signals.

Aspect 22 is the method of any of aspects 18 to 21, further comprising: receiving a positioning environment based on the simulated positioning measurements; and training the positioning model based on the positioning environment.

Aspect 23 is the method of any of aspects 18 to 22, wherein transmitting the environment information comprises transmitting a computer-aided design (CAD) file including the environment information.

Aspect 24 is the method of any of aspects 18 to 23, wherein the request comprises at least one of: a second indicator of a set of file formats supported by the wireless device for processing the environment information; a third indicator of a set of environment attributes supported by the wireless device for processing the environment information; or a fourth indicator of a location of the wireless device.

Aspect 25 is the method of any of aspects 18 to 24, further comprising: transmitting a second indicator of at least one of a plurality of sets of environment information or a plurality of areas, wherein the plurality of sets of environment information comprises the environment information, wherein the plurality of areas comprises the area; and receiving a third indicator of at least one of a first selection of the environment information from the plurality of sets of environment information or a second selection of the area from the plurality of areas before transmitting the environment information.

Aspect 26 is the method of any of aspects 18 to 25, wherein receiving the indicator of the request comprises receiving a long-term evolution (LTE) positioning protocol (LPP) message comprising the indicator of the request.

Aspect 27 is the method of aspect 26, wherein the LPP message comprises an assistance data request message.

Aspect 28 is the method of any of aspects 18 to 27, wherein transmitting the environment information associated with the area comprises transmitting a long-term evolution (LTE) positioning protocol (LPP) message comprising the environment information associated with the area.

Aspect 29 is the method of aspect 28, wherein the LPP message comprises at least one of an LPP broadcast message or an LPP assistance data response message.

Aspect 30 is the method of any of aspects 18 to 29, wherein the wireless device includes at least one of: a network node; a base station; a transmission reception point (TRP); a network entity; or a location management function (LMF). In some aspects, the network entity or LMF may not have a wireless transceiver, but may be configured to communicate with a wireless device, for example via a base station or an RU.

Aspect 31 is an apparatus for wireless communication, comprising: at least one memory; and at least one processor coupled to the at least one memory and, based at least in part on information stored in the at least one memory, the at least one processor, individually or in any combination, is configured to perform the method of any of aspects 1 to 30.

Aspect 32 is an apparatus for wireless communication, comprising means for performing each step in the method of any of aspects 1 to 30.

Aspect 33 is the apparatus of any of aspects 31 to 32, further comprising a transceiver (e.g., a transceiver coupled to the at least one processor in Aspect 31) configured to receive or to transmit in association with the method of any of aspects 1 to 30.

Aspect 34 is a computer-readable medium (e.g., a non-transitory computer-readable medium) storing computer executable code, the code when executed by at least one processor causes the at least one processor to perform the method of any of aspects 1 to 30.

What is claimed is:

1. An apparatus for wireless communication at a wireless device, comprising:
   at least one memory; and
   at least one processor coupled to the at least one memory and, based at least in part on information stored in the at least one memory, the at least one processor, individually or in any combination, is configured to:
      receive environment information associated with an area;
      receive a report message comprising a measured set of positioning signals transmitted within the area;
      simulate a set of positioning measurements based on the environment information;
      calculate a positioning environment based on the simulated set of positioning measurements and further based on the measured set of positioning signals; and
      output the positioning environment to train a positioning model.

2. The apparatus of claim 1, wherein the environment information comprises at least one of:
   a set of dimension attributes for an object within the area;
   a set of material attributes for the object within the area; or
   a set of location attributes for the object within the area.

3. The apparatus of claim 1, wherein, to simulate the set of positioning measurements based on the environment information, the at least one processor, individually or in any combination, is configured to:
   simulate a set of specular reflection effects on the set of positioning measurements based on the environment information; or
   simulate a set of non-specular reflection effects on the set of positioning measurements based on the environment information.

4. The apparatus of claim 1, wherein, to output the positioning environment, the at least one processor, individually or in any combination, is configured to:
   train the positioning model at the wireless device based on the positioning environment.

5. The apparatus of claim 1, wherein, to output the positioning environment, the at least one processor, individually or in any combination, is configured to:
   transmit the positioning environment to a training entity to train the positioning model.

6. The apparatus of claim 1, wherein, to receive the environment information, the at least one processor, individually or in any combination, is configured to:

receive a computer-aided design (CAD) file including the environment information.

7. The apparatus of claim 1, wherein the at least one processor, individually or in any combination, is further configured to:

transmit a first indicator of a request for the environment information before receiving the environment information.

8. The apparatus of claim 7, wherein the request comprises at least one of:

a second indicator of a set of file formats supported by the wireless device for processing the environment information;

a third indicator of a set of environment attributes supported by the wireless device for processing the environment information; or a fourth indicator of a location of the wireless device.

9. The apparatus of claim 1, wherein the at least one processor, individually or in any combination, is further configured to:

receive a second indicator of at least one of a plurality of sets of environment information or a plurality of areas, wherein the plurality of sets of environment information comprises the environment information, wherein the plurality of areas comprises the area; and transmit a third indicator of at least one of a first selection of the environment information from the plurality of sets of environment information or a second selection of the area from the plurality of areas before receiving the environment information.

10. The apparatus of claim 7, wherein, to transmit the first indicator of the request, the at least one processor, individually or in any combination, is configured to:

transmit a long-term evolution (LTE) positioning protocol (LPP) message comprising the first indicator of the request.

11. The apparatus of claim 10, wherein the LPP message comprises an assistance data request message.

12. The apparatus of claim 1, further comprising a transceiver coupled to the at least one processor, wherein, to receive the environment information associated with the area, the at least one processor, individually or in any combination, is configured to:

receive, via the transceiver, a long-term evolution (LTE) positioning protocol (LPP) message comprising the environment information associated with the area.

13. The apparatus of claim 12, wherein the LPP message comprises at least one of an LPP broadcast message or an LPP assistance data response message.

14. The apparatus of claim 1, wherein the wireless device includes at least one of:

a user equipment (UE);

a positioning reference unit (PRU);

a network node;

a base station;

a transmission reception point (TRP);

a network entity; or a location management function (LMF).

15. A method of wireless communication at a wireless device, comprising:

receiving environment information associated with an area;

receiving a report message comprising a measured set of positioning signals transmitted within the area;

simulating a set of positioning measurements based on the environment information;

calculating a positioning environment based on the simulated set of positioning measurements and further based on the measured set of positioning signals; and outputting the positioning environment to train a positioning model.

16. The apparatus of claim 1, wherein, to simulate the set of positioning measurements based on the environment information, the at least one processor, individually or in any combination, is configured to:

simulate a set of diffraction effects on the set of positioning measurements based on the environment information; or simulate a set of scattering effects on the set of positioning measurements based on the environment information.

\* \* \* \* \*